US012645173B2

(12) United States Patent
Sako

(10) Patent No.: US 12,645,173 B2
(45) Date of Patent: Jun. 2, 2026

(54) IMAGE HEATING APPARATUS THAT DETERMINES IF A REGION IS A PASSING REGION BASED ON A TEMPERATURE DEVIATION RELATED TO A REFERENCE HEATING REGION, AND IMAGE FORMING APPARATUS

(71) Applicant: Canon Kabushiki Kaisha, Tokyo (JP)

(72) Inventor: Masato Sako, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/071,922

(22) Filed: Mar. 6, 2025

(65) Prior Publication Data

US 2025/0199444 A1 Jun. 19, 2025

Related U.S. Application Data

(63) Continuation of application No. 18/327,989, filed on Jun. 2, 2023, now Pat. No. 12,271,132.

(30) Foreign Application Priority Data

Jun. 6, 2022 (JP) ................................ 2022-091796

(51) Int. Cl.
*G03G 15/20* (2006.01)
*G03G 15/00* (2006.01)
*H05B 3/00* (2006.01)

(52) U.S. Cl.
CPC ..... *G03G 15/2039* (2013.01); *G03G 15/2053* (2013.01); *G03G 15/5004* (2013.01);
(Continued)

(58) Field of Classification Search
USPC ........................................................... 399/69
See application file for complete search history.

(56) References Cited

U.S. PATENT DOCUMENTS 10,838,329 B2 11/2020 Sako et al.
2011/0026947 A1* 2/2011 Hayamizu .......... G03G 15/2042 399/33

(Continued)

FOREIGN PATENT DOCUMENTS

JP 2014059508 A 4/2014
JP 2017227866 A 12/2017

(Continued)

*Primary Examiner* — Quana Grainger
(74) *Attorney, Agent, or Firm* — Venable LLP

(57) ABSTRACT

Whether a first heating region is actually a passing heating region or a non-passing heating region which a recording material does not pass through, is detected by the temperature detected by a temperature detecting portion, based on a difference between a detected temperature by a temperature detecting portion in a reference heating region, which is specified to a heating region including a conveyance reference position of the recording material, and a detected temperature in a first heating region which does not include the conveyance reference position and is specified to a passing heating region which the recording material passing through. In a case where it is determined that the first heating region is the non-passing heating region, a prevention control, to prevent overheat of the first heating region is performed in the heating processing of the recording material that passes the nip portion after the determination.

14 Claims, 18 Drawing Sheets

(52) U.S. Cl.
CPC . *H05B 3/0095* (2013.01); *G03G 2215/00805* (2013.01); *H05B 2203/007* (2013.01)

(56) References Cited

U.S. PATENT DOCUMENTS

| | | | |
|---|---|---|---|
| 2012/0321334 | A1 | 12/2012 | Asano |
| 2019/0121267 | A1 | 4/2019 | Miyauchi |

FOREIGN PATENT DOCUMENTS

| | | | |
|---|---|---|---|
| JP | 2019144493 | A | 8/2019 |
| JP | 2020181053 | A | 11/2020 |

* cited by examiner

FIG. 5

PAPER PASSING ZONE

| Kp | Ki | Kd | C |
|---|---|---|---|
| 1.5 | 0.09 | 0 | 30 |

NON-PAPER PASSING ZONE

| Kp | Ki | Kd | C |
|---|---|---|---|
| 1.5 | 0.09 | 0 | 0 |

IMAGE HEATING APPARATUS THAT DETERMINES IF A REGION IS A PASSING REGION BASED ON A TEMPERATURE DEVIATION RELATED TO A REFERENCE HEATING REGION, AND IMAGE FORMING APPARATUS

CROSS-REFERENCE TO RELATED APPLICATIONS

This application is a Continuation of U.S. patent application Ser. No. 18/327,989, filed on Jun. 2, 2023, which is hereby incorporated herein by reference in its entirety.

BACKGROUND OF THE INVENTION

Field of the Invention

The present invention relates to a thermal fixing apparatus that is included in an electrophotographic recording type image forming apparatus, such as a copier and a printer, and an image heating apparatus, such as a glossing apparatus, which increases a gloss value of an image by reheating a fixed toner image on a recording material.

Description of the Related Art

An image heating apparatus that is currently available includes a tubular fixing film (fixing member), a heater (heating unit) that is in contact with the inner surface of the fixing film, and a pressure roller (heating member) that forms a nip portion with the heater via the fixing film. Japanese Patent Application Publication No. 2014-059508 proposes an apparatus that divides a heating resistor on a heater into a plurality of heating regions in the longitudinal direction of the heater, and changes a heating distribution of the heater in accordance with the size of the recording material.

In this configuration, heat accumulation may be generated locally in a case where the size of the recording material that is actually passed is smaller than the size of the recording material specified by the user. In other words, out of the plurality of heating regions where a recording material should pass through, a recording material does not actually pass the heating regions on both ends in the longitudinal direction, even if these regions are controlled at high temperature assuming that the recording material will pass, and in this case, heat excessively accumulates in the members. Further, in a case where the size of the recording material that actually passes is larger than the size of the recording material specified by the user, the heating regions on both ends in the longitudinal direction are controlled at low temperature assuming that the recording material will not pass, but the recording material actually passes these regions and heat is excessively drawn from the members. In both cases, conveyance of the recording material becomes unstable because the temperature distribution in the longitudinal direction of the fixing film and the pressure roller becomes uneven, and in some cases this may damage the image heating apparatus.

To prevent this state, Japanese Patent Application Publication No. 2020-181053 proposes a configuration (1), where the same power is supplied to each heating region, and the temperature change of the temperature detection unit is checked, so as to estimate whether the recording material passes through each heating region. Japanese Patent Application Publication No. 2020-181053 also proposes a configuration (2), where each heating region is temperature-controlled at a predetermined target temperature, and it is estimated whether each heating region is a paper passing zone where the recording material passes, or a non-paper passing zone where the recording material does not pass, based on the deviation of the power supplied to each heating region.

SUMMARY OF THE INVENTION

In the case of the above mentioned configurations (1) and (2) however, when the target temperature is changed depending on the heating region or when different power is supplied to each heating region, it may become difficult to estimate whether a recording material has passed. For example, in a case where image density is different between two heating regions where a recording material is expected to pass, different target temperatures may be set for a heating region in which the image density is high and a heating region in which the image density is low respectively. In this case, heater temperature and supply power become different, hence it is difficult to estimate whether the recording material passes these regions.

It is an object of the present invention to provide a technique to stabilize conveyance of recording materials, and to prevent damage of the apparatus.

To achieve this object, an image heating apparatus of the present invention includes:

- a tubular film;
- a heater that is disposed in an inner space of the film and includes a plurality of heating elements arranged in a longitudinal direction of the heater, which is a direction perpendicular to a conveyance direction of a recording material;
- a roller that is in contact with an outer peripheral surface of the film, and sandwiches the film with the heater, and forms a nip portion with the film, where a recording material on which a toner image is formed is sandwiched and conveyed;
- a temperature detecting portion configured to detect temperature of a plurality of heating regions which are heated by the plurality of heating elements respectively;
- an acquiring portion configured to acquire recording material information including a size of a recording material; and
- a control portion, wherein
- in the image heating apparatus, the control portion individually controls the plurality of heating elements based on the recording material information, and the toner image is heated in the nip portion, wherein
- the plurality of heating regions include
- a reference heating region that is specified as a heating region, which includes a conveyance reference position of the recording material, by the recording material information, and
- a first heating region that is specified as a passing heating region, which does not include the conveyance reference position and which the recording material passes through, by the recording material information, wherein
- in a case of performing heating processing consecutively on a plurality of recording materials,
- the control portion acquires a deviation of a difference between a control target temperature and a detected temperature by the temperature detecting portion in the first heating region, with respect to a difference between a control target temperature and the detected temperature in the reference heating region; and determines whether the first heating region is actually the passing heating region or a non-passing heating region which a recording material does not pass through, based on whether the deviation is within a predetermined range or not, and in a case where it is determined that the first heating region is the non-passing heating region, the control portion performs a prevention control to prevent overheat of the first heating region in heating processing of the recording material that passes through the nip portion after the determination.

To achieve the object, an image heating apparatus of the present invention includes:

a tubular film;

a heater that is disposed in an inner space of the film, and includes a plurality of heating elements arranged in a longitudinal direction of the heater, which is a direction perpendicular to a conveyance direction of a recording material;

a roller that is in contact with an outer peripheral space of the film, sandwiches the film with the heater, and forms a nip portion with the film where a recording material on which a toner image is formed is sandwiched and conveyed;

a temperature detecting portion configured to detect temperature of a plurality of heating regions which are heated by the plurality of heating elements respectively;

an acquiring portion configured to acquire recording material information including a size of a recording material; and a control portion, wherein in the image heating apparatus, the control portion individually controls the plurality of heating elements based on the recording material information, and the toner image is heated in the nip portion, wherein the plurality of heating regions include a reference heating region that is specified as a heating region, which includes a conveyance reference position of the recording material, by the recording material information, and a second heating region that is specified as a non-passing heating region which a recording material does not pass through, by the recording material information, wherein in a case of performing heating processing consecutively on a plurality of recording materials, the control portion acquires a deviation of a difference between a control target temperature and a detected temperature by the temperature detecting portion in the second heating region, with respect to a difference between a control target temperature and the detected temperature in the reference heating region, and determines whether the second heating region is actually the passing heating region or a non-passing heating region which a recording material does not pass through, based on whether the deviation is within a predetermined range or not, and in a case where it is determined that the second heating region is the passing heating region, the control portion performs a prevention control to prevent underheat of the second heating region in the heating processing of the recording material that passes through the nip portion after the determination.

To achieve the object, an image forming apparatus of the present invention includes:

an image forming portion configured to form a toner image on a recording material; and a fixing portion configured to fix a toner image formed on a recording material to the recording material, wherein the fixing portion is the image heating apparatus of the present invention.

According to the present invention, conveyance of recording materials is stabilized, and damage of the apparatus is prevented.

Further features of the present invention will become apparent from the following description of exemplary embodiments with reference to the attached drawings.

BRIEF DESCRIPTION OF THE DRAWINGS

FIG. 5 indicates PID control parameters according to Embodiment 1;

DESCRIPTION OF THE EMBODIMENTS

Embodiments of the present invention will now be described in detail based on examples with reference to the drawings. Dimensions, materials, shapes, relative positional relationships, and the like of components described in the embodiments may be changed as necessary in accordance with the configuration and various conditions of the apparatus to which the present invention is applied. Further, not all of the combinations of the features described in the present embodiments are essential for a solution in the present invention. The composing elements described in the embodiments are merely examples, and are not intended to limit the scope of the invention thereto.

Embodiment 1

1. Configuration of Image Forming Apparatus

Figure 1:
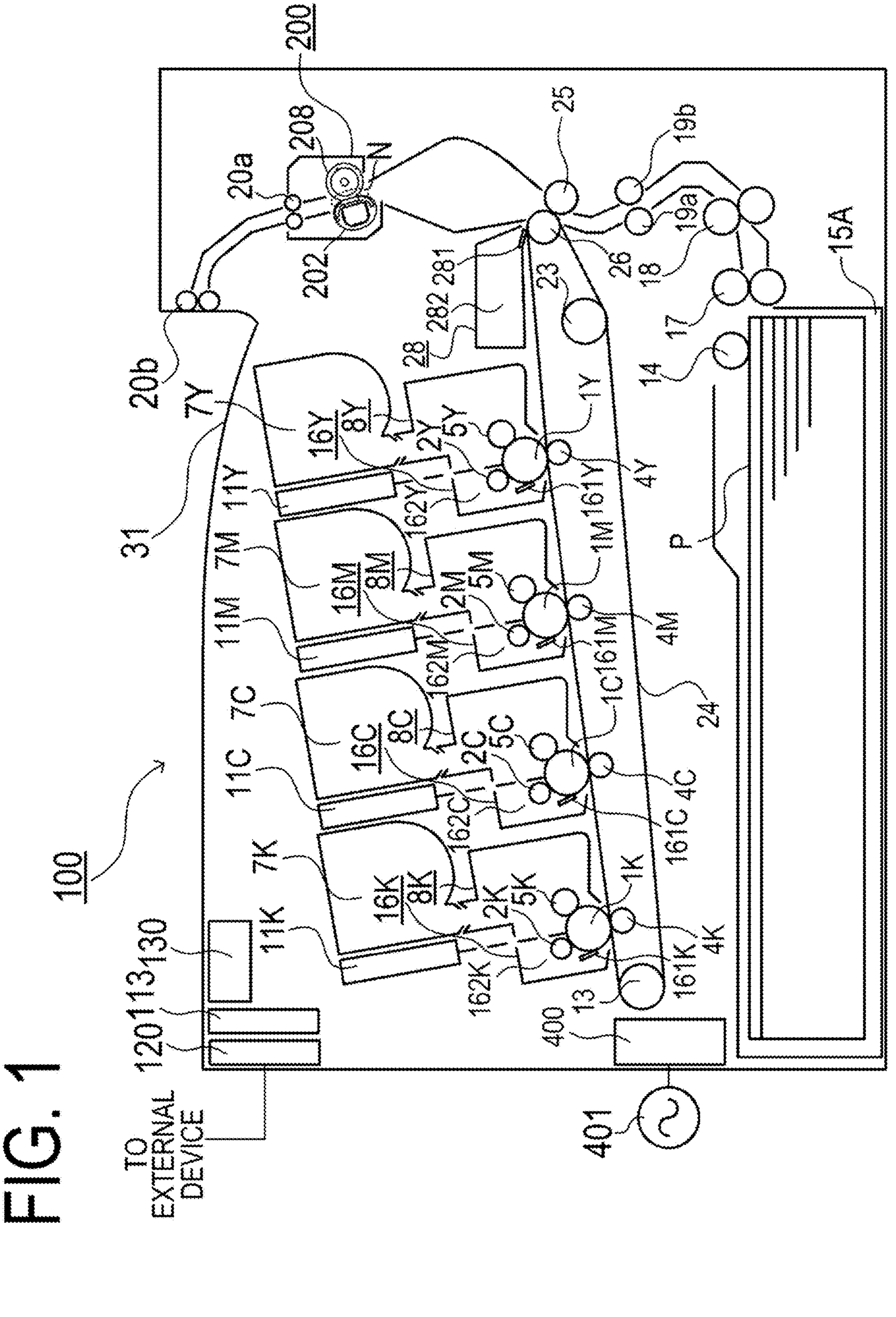
FIG. 1 is a cross-sectional view of an image forming apparatus according to an embodiment of the present invention.

FIG. 1 is a schematic cross-sectional view of an image forming apparatus 100 according to Embodiment 1 of the present invention. In Embodiment 1, a color image forming apparatus that uses an intermediate transfer belt will be described as an example of the image forming apparatus. A Y, M, C or K suffix attached to each reference number indicates a color of the toner, and may be omitted in a case where the description is common to the four colors.

A video controller 120 is an acquiring portion that acquires information on an image to be formed on a recording material, and information on size, type, and the like of the recording material on which an image is formed, and receives and processes image information and print instructions sent from such an external device as a personal computer. The image forming apparatus 100 of Embodiment 1 includes an operation panel 130, and in some cases various information and print instructions, which the user inputted via the operation panel 130, may be transmitted to an engine controller 113. The engine controller 113 is connected with the video controller 120, and controls each portion constituting the image forming apparatus in accordance with an instruction from the video controller 120.

The image forming apparatus 100 of Embodiment 1 is a four-drum inline type, and is 600 dpi full color printer which includes an automatic double-sided printing mechanism. The image forming apparatus 100 includes: toner image forming unit; transfer unit for transferring a formed toner image onto a recording material; and a fixing unit whereby an unfixed toner image, transferred onto the recording material, is fixed to the recording material. The configuration related to the processing steps up to forming the unfixed toner image on the recording material, that is, the toner image forming unit and the transfer unit, corresponds to an image forming portion of the present invention. The toner image forming unit is constituted of a photosensitive drum 1 (image bearing member), a charging roller 2, an exposure scanner portion 11 (exposure unit), a developing device 8 (developing unit), a toner container 7, a drum cleaner 16, and the like. The transfer unit is constituted of an intermediate transfer belt 24 (rotating member), a secondary transfer roller 25 (transfer member), a driving roller 26 which drives the intermediate transfer belt 24 and functions as an opposing roller of the secondary transfer roller 25, a stretching roller 13, an auxiliary roller 23 and a primary transfer roller 4. Further, as the fixing unit, the image forming apparatus 100 includes a fixing apparatus 200 (image heating apparatus) which heats a toner image formed on the recording material. A control circuit 400 (control unit) connected to a commercial AC power supply 401 supplies power to the fixing apparatus 200. The engine controller 113 which controls each component of the image forming apparatus, and the control circuit 400 which performs power supply control for the fixing apparatus 200, correspond to the control portion of the present invention.

When a print instruction is received from an external device, the video controller 120 starts conversion processing to convert an original image received from the external device into image data (not illustrated) that can be printed by this image forming apparatus. At this point, the video controller 120 sends an instruction to start the image forming (hereafter called "print start command") to the engine controller 113. When the video controller 120 sends the print start command, heating operation of the fixing apparatus 200 and driving of the exposure scanner portion 11 start, and a recording material P is fed from a paper feeding cassette 15A into the image forming apparatus by a pickup roller 14 and paper feeding rollers 17 and 18. Then the recording material P is sandwiched by a roller type synchronizing rotating member to synchronize the later mentioned image forming operation and conveyance of the recording material P, that is, the recording material is sandwiched between a conveyance (resist) roller 19*a* and an opposing conveyance (resist) roller 19*b*, and stops and stands by. Then when the image data conversion processing by the video controller 120 ends and the image data is sent to the engine controller 113, the engine controller 113 instructs the print sequence.

The photosensitive drum 1 is an aluminum cylinder of which outer peripheral surface is coated with an organic photoconductive layer, and is rotated by driving force transferred from a driving motor (not illustrated). The driving motor rotates the photosensitive drum 1 in the clockwise direction in accordance with the image forming operation. The surface (peripheral surface) of the photosensitive drum 1 is charged at a predetermined potential by the function of the charging roller 2, and an electrostatic latent image is formed thereon by laser exposure performed by the exposure scanner portion 11. The electrostatic latent image is formed in accordance with the image data received by the engine controller 113.

The developing device 8 is a unit for visualizing the electrostatic latent image, and develops each Y, M, C and K color for each station. In each developing device, a developing roller 5 is disposed to which developing bias to visualize the electrostatic latent image is applied. The electrostatic latent image, formed on the surface of the photosensitive drum 1, is developed as a single color toner image in this way by the function of the developing device 8.

The intermediate transfer belt 24 is in contact with the photosensitive drum 1, and rotates counterclockwise synchronizing with the rotation of the photosensitive drum 1 when a color image is formed. A single color toner image that is developed is transferred to the intermediate transfer belt 24 by the function of primary transfer bias applied to the primary transfer roller 4. The single color toner image of each color of Y, M, C and K is superimposed and transferred to the intermediate transfer belt 24 in sequence, whereby a multi-color toner image is formed on the intermediate transfer belt 24. Toner that is not transferred onto the intermediate transfer belt and remains on each photosensitive drum 1 is collected by a drum cleaner 16, which is disposed in contact with the photosensitive drum 1. The drum cleaner for each color is constituted of a cleaner blade 161 and a toner collection container 162 respectively. The multi-color toner image formed on the intermediate transfer belt 24 is conveyed to a secondary transfer nip portion, which is formed between the intermediate transfer belt 24 and the secondary transfer roller 25, by the secondary transfer roller 25 and the driving roller 26 (opposing roller). At the same time, the recording material P, which is in the standby state of being sandwiched between the conveyance roller pair 19*a* and 19*b*, is conveyed to the secondary transfer nip portion by the function of the conveyance roller pair 19*a* and 19*b*, synchronizing with the conveying of the multi-color toner image on the intermediate transfer belt 24. Then in the secondary transfer nip portion, the multi-color toner image is transferred all at once from the intermediate transfer belt 24 to the recording material P, by the function of the secondary transfer bias applied to the secondary transfer roller 25.

The fixing apparatus 200 is mainly constituted of a pressure roller 208 (pressing member) and a fixing film 202 (fixing member) that press-contacts with the pressure roller 208 to form a fixing nip portion N. The recording material P, holding the multi-color toner image, is conveyed by the rotation of the pressure roller 208 and the rotation of the fixing film 202 that is driven thereby, and receives heat and pressure at the fixing nip portion N, whereby the toner image is fixed to the surface of the recording material P.

The recording material P, after the toner is fixed, is discharged to a paper delivery tray 31 by discharging rollers 20*a* and 20*b*, and the image forming operation is ended thereby.

A belt cleaner 28 is for cleaning untransferred toner remaining on the intermediate transfer belt 24 using a cleaner blade 281, and untransferred toner collected here is stored in a cleaner container 282 as waste toner.

The image forming apparatus 100 of Embodiment 1 supports a plurality of recording material sizes. In the paper feeding cassette 15A, letter size paper (about 216 mm×279 mm), A4 size paper (210 mm×297 mm), B5 size paper (about 182 mm×257 mm), A5 size paper (148 mm×210 mm), and the like can be set.

2. Configuration of Fixing Apparatus (Image Heating Apparatus)

Figure 2:
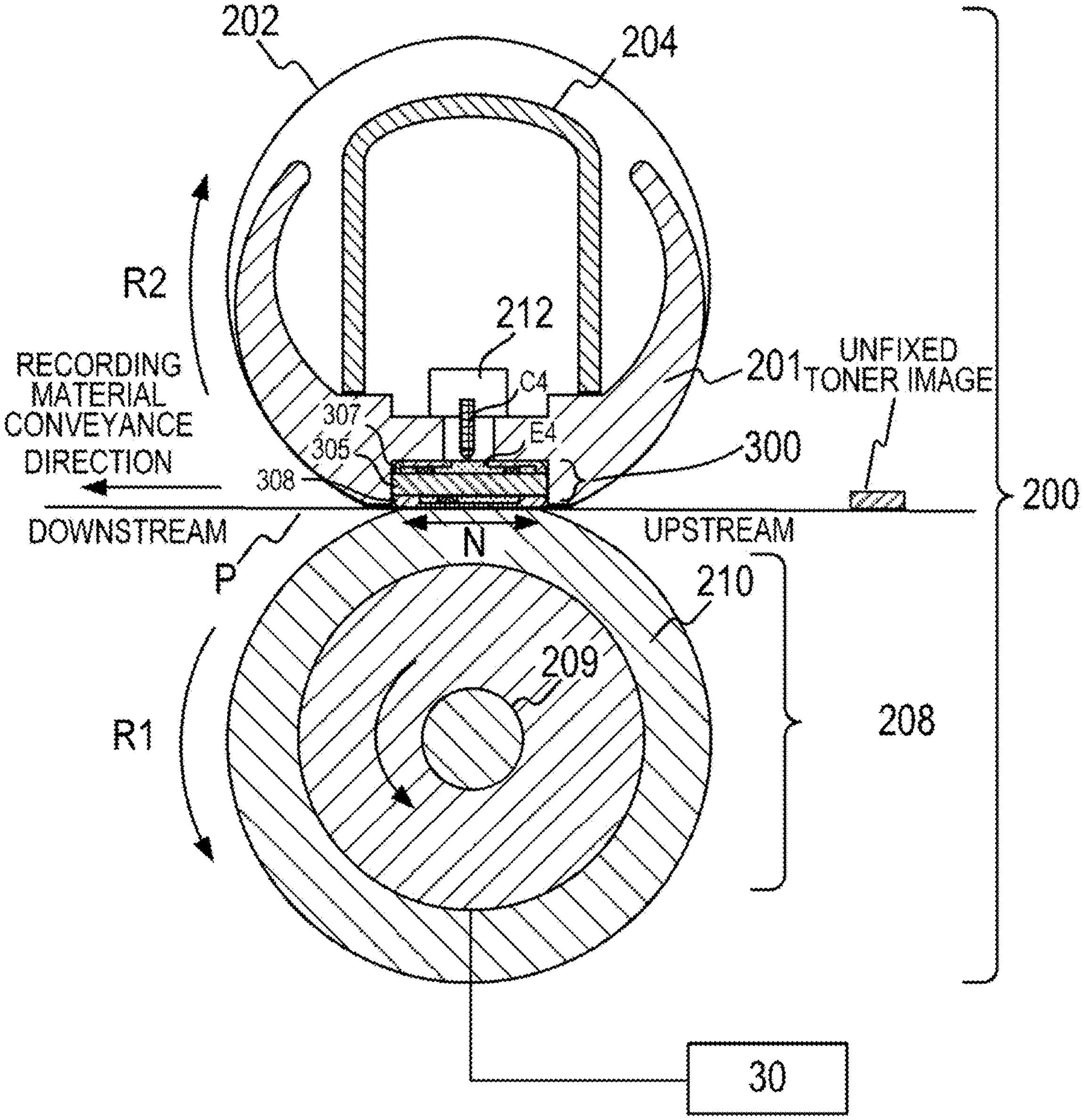
FIG. 2 is a cross-sectional view of an image heating apparatus according to Embodiment 1.

FIG. 2 is a schematic cross-sectional view of the fixing apparatus 200 according to Embodiment 1. The fixing apparatus 200 includes the tubular fixing film 202, a heater 300, the pressure roller 208, and a metal stay 204. The heater 300 is disposed in an inner space of the tubular fixing film 202 (space enclosed by the inner peripheral surface of the fixing film 202), and is in contact with the inner surface (inner peripheral surface) of the fixing film 202. The pressure roller 208 is in contact with the outer surface (outer peripheral surface) of the fixing film 202, so as to sandwich the fixing film 202 with the heater 300, and forms the fixing nip portion N with the heater 300 and the fixing film 202. An unfixed toner image formed on the recording material P is fixed to the surface of the recording material P by the heat of the heater 300 (heating unit) and the pressure applied to the recording material P sandwiched and conveyed through the fixing nip portion N.

The fixing film 202, which is also called an endless belt, is a multi-layer heat resistant film formed in a tubular shape, and a thin heat resistant resin (e.g. polyimide) or metal (e.g. stainless steel) can be used as a base layer thereof. On the surface of the fixing film 202, a heat resistant resin which excels in releasability (e.g. tetrafluoroethylene-perfluoroalkyl vinyl ether copolymer (PFA)) is coated to form a release layer, in order to prevent the adhesion of toner and ensure separation from the recording material P. In a case of an apparatus to form color images, in particular, a heat resistant rubber (e.g. silicon rubber) may be formed as an elastic layer between the base layer and the release layer in order to improve image quality. On the inner surface of the fixing film 202, a lubricant such has heat resistant grease (not illustrated) is disposed, in order to reduce the influence of rotation torque generated by the friction between the fixing film 202 and the heater 300.

The pressure roller 208 includes a core metal 209 made of iron, aluminum or the like, and an elastic layer 210 made of a silicon rubber or the like. A release layer may be formed on the surface thereof, just like the fixing film 202.

The heater 300 is a heater heated by the heating element disposed on a ceramic substrate 305, where a surface protective layer 308 is disposed on the side of the fixing nip portion N, and a surface protective layer 307 is disposed on the opposite side of the fixing nip portion N. A plurality of electrodes (electrode E4 indicated in FIG. 2 is a representative) and a plurality of electric contacts (electric contact C4 indicated in FIG. 2 is a representative) are disposed on the opposite side of the fixing nip portion N, so that power is supplied from each electric contact to each electrode. The heater 300 will be described in detail later.

Safety elements 212, such as a thermos switch and a temperature fuse, are in contact with the heater 300 directly or indirectly via a heater holding member 201. The safety elements 212 are activated by abnormal heating of the heater 300, and shut the power supplied to the heater 300 OFF.

The heater 300 is held by the heater holding member 201 which is made of heat resistant resin, and heats the fixing film 202. The heater holding member 201 also has a guide function to guide the rotation of the fixing film 202.

The metal stay 204 receives pressing force (not illustrated) and energizes the heater holding member 201 holding the heater 300 toward the pressure roller 208, whereby the fixing nip portion N is formed between the fixing film 202 and the pressure roller 208.

The pressure roller 208 rotates in the arrow R1 direction by the power received from a motor 30. By the rotation of the pressure roller 208, the fixing film 202 is driven and rotated in the arrow R2 direction. The recording material P is sandwiched and conveyed through the fixing nip portion N and receives heat of the fixing film 202, whereby the unfixed toner image on the recording material P is fixed.

3. Configuration of Heater

Figures 3A, 3B:
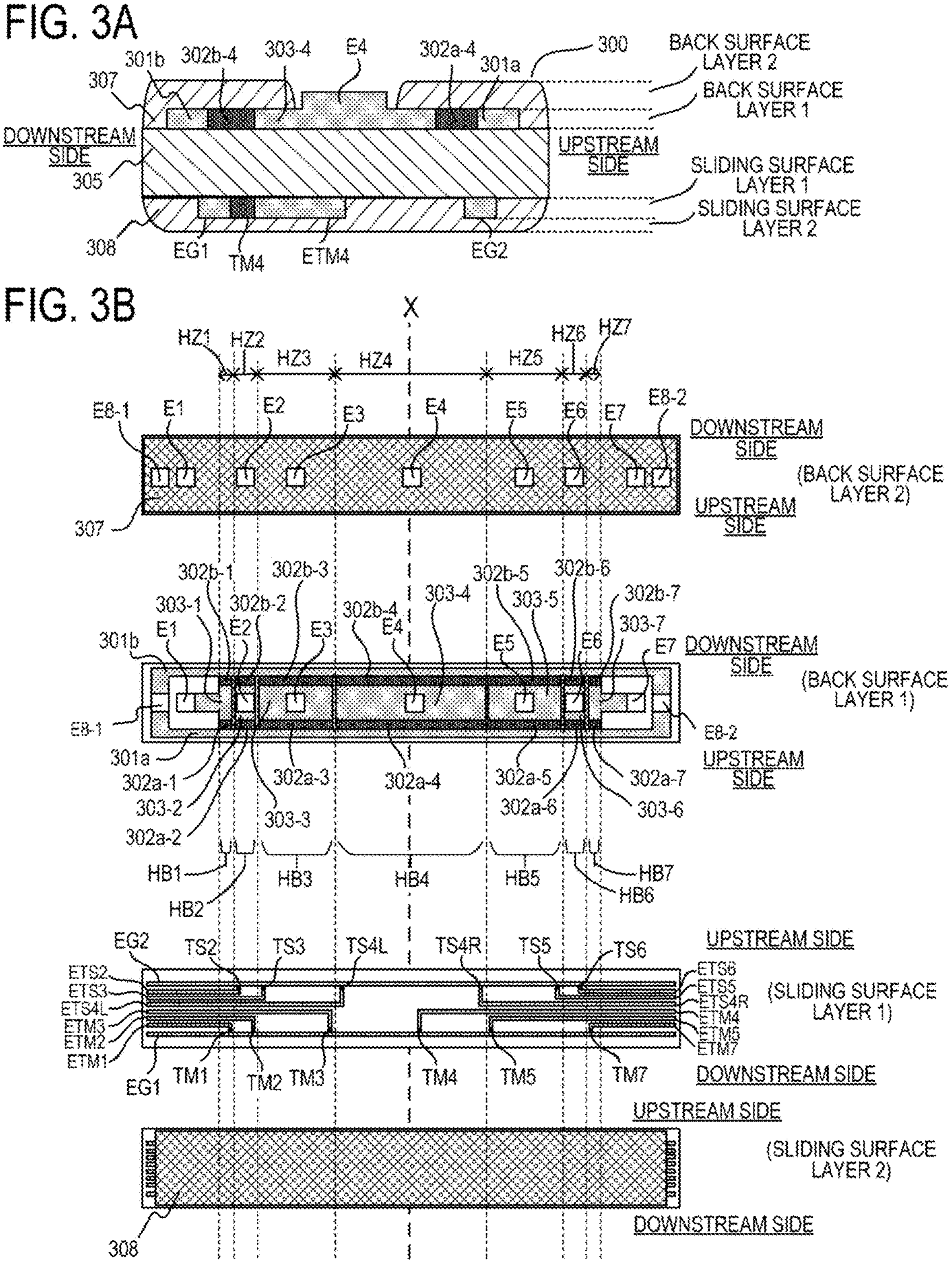
FIGS. 3A and 3B are heater configuration diagrams according to Embodiment 1.

FIGS. 3A and 3B indicate a configuration of the heater 300 according to Embodiment 1. FIG. 3A is a cross-sectional view around a conveyance reference position X indicated in FIG. 3B. The conveyance reference position X is defined as a reference position to convey the recording material P. In Embodiment 1, the recording material P is conveyed so that the center of the recording material P passes through the conveyance reference position X.

The heater 300 has a first conductor 301 (301*a*, 301*b*) disposed, on the surface of the substrate 305 toward the back surface layer side, along the longitudinal direction of the substrate 305 (heater 300), which is perpendicular to the conveyance direction of the recording material. Further, a second conductor 303 (303-4 at a position near the conveyance reference position X) is disposed on the substrate 305 along the longitudinal direction at a position different from the first conductor 301 in the conveyance direction of the recording material. The first conductor 301 is separated into the conductor 301*a* disposed on the upstream side of the conveyance direction of the recording material P, and the conductor 301*b* disposed on the downstream side thereof. Between the first conductor 301 and the second conductor 303, a heating element 302, that heats up by the power supplied via these conductors, is disposed.

In Embodiment 1, the heating element 302 is separated into heating elements 302*a* disposed on the upstream side of the conveyance direction of the recording material P (302*a*-4 at a position near the conveyance reference position X), and heating elements 302*b* disposed on the downstream side thereof (302*b*-4 at a position near the conveyance reference position X).

On the back surface layer 2 of the heater 300, the insulative surface protective layer 307 covering the heating element 302, the first conductor 301 and the second conductor 303 (303-4 at a position near the conveyance reference position X) is disposed, avoiding the electrode portions (E4 at a position near the conveyance reference position X).

FIG. 3B is a plan view of each layer of the heater 300. The heater 300 is divided into 7 heating regions (HZ1 to HZ7) in the longitudinal direction. In FIG. 3B, the length from the left end of the heating region HZ1 to the right end of the heating region HZ7 is 216 mm, which corresponds to the letter size width. The length from the left end of the heating region HZ2 to the right end of the heating region HZ6 is 210 mm, which corresponds to the A4 size width. The length from the left end of the heating region HZ3 to the right end of the heating region HZ5 is 182 mm, which corresponds to the B5 size width. The length from the left end to the right end of the heating region HZ4 is 105 mm, which corresponds to the A6 size width.

On the back surface layer 1 of the heater 300, the heating blocks (heating units) blocks HB1 to HB7 are formed corresponding to the heating regions HZ1 to HZ7 respectively.

The heating blocks HB1 to HB7 are constituted of the heating elements 302*a*-1 to 302*a*-7 and the heating elements 302*b*-1 to 302*b*-7 respectively, which are formed symmetrically with respect to the conveyance direction of the recording material. The heating elements 302*a*-1 to 302*a*-7 are disposed in the longitudinal direction of the heater, which is perpendicular to the conveyance direction of the recording material. In the same manner, the heating elements 302*b*-1 to 302*b*-7 are also disposed in the longitudinal direction of the heater. The first conductor 301 is constituted of the conductor 301*a* which is connected with the heating elements 302*a*-1 to 302*a*-7, and the conductor 301*b* which is connected with the heating elements 302*b*-1 to 302*b*-7. In the same manner, the second conductor 303 is divided into 7 conductors 303-1 to 303-7 to support the 7 heating blocks HB1 to HB7.

Electrodes E1 to E7 are electrodes to supply power to the heating blocks HB1 to HB7 respectively via the conductors 303-1 to 303-7. The electrodes E8-1 to E8-2 are electrodes to be connected to a common electric contact to supply power to the 7 heating blocks HB1 to HB7 via the conductor 301*a* and the conductor 301*b*.

The front surface protective layer 307 of the back surface layer 2 of the heater 300 is formed avoiding the portions of the electrodes E1 to E7, E8-1 and E8-2. Each heating element is connected to the control circuit 400, which controls power supplied to the heating elements, from the back surface layer side of the heater 300 to each electrode via the electric contact.

On the sliding surface layer 1 on the side of the sliding surface (surface on the side in contact with the inner surface of the fixing film 202) of the heater 300, various thermistors are disposed as temperature detection elements constituting a temperature detecting portion. In other words, main thermistors (control temperature detection units) TM1 to TM5 and ETN7 to detect the temperatures of the heating blocks HB1 to HB7 of the heater 300, and sub-thermistors TS2 to TS6 are disposed. On the sliding surface layer 1, conductors ETM1 to ETM5, TM7, ETS2 to ETS6, EG1 and EG2 are formed to energize each thermistor. The roles of the main thermistors and the sub-thermistors will be described later.

The conductors ETM1, ETM2, ETM3, ETM4, ETM5, and ETM7 are connected to the main thermistors TM1, TM2, TM3, TM4, TM5 and TM7 respectively. The conductors ETS2, ETS3, ETS4L, ETS4R, ETS5 and ETM6 are connected to the sub-thermistors TS2, TS3, TS4L, TS4R, TS5 and TS6 respectively. The conductor EG1 is connected to all the main thermistors TM1 to TM5 and TM7, and the conductor EG2 is connected to all the sub-thermistors TS2 to TS6.

The sliding surface layer 2 on the sliding surface (surface in contact with the endless belt) of the heater 300 includes the front surface protective layer 308 (glass in Embodiment 1), which is slidable. The front surface protective layer 308 is formed at least on a region which slides with the fixing film 202, avoiding both ends of the heater 300, where electric contacts with the conductors for detecting resistance value of the thermistors are disposed.

4. Configuration of Control Circuit

Figure 4:
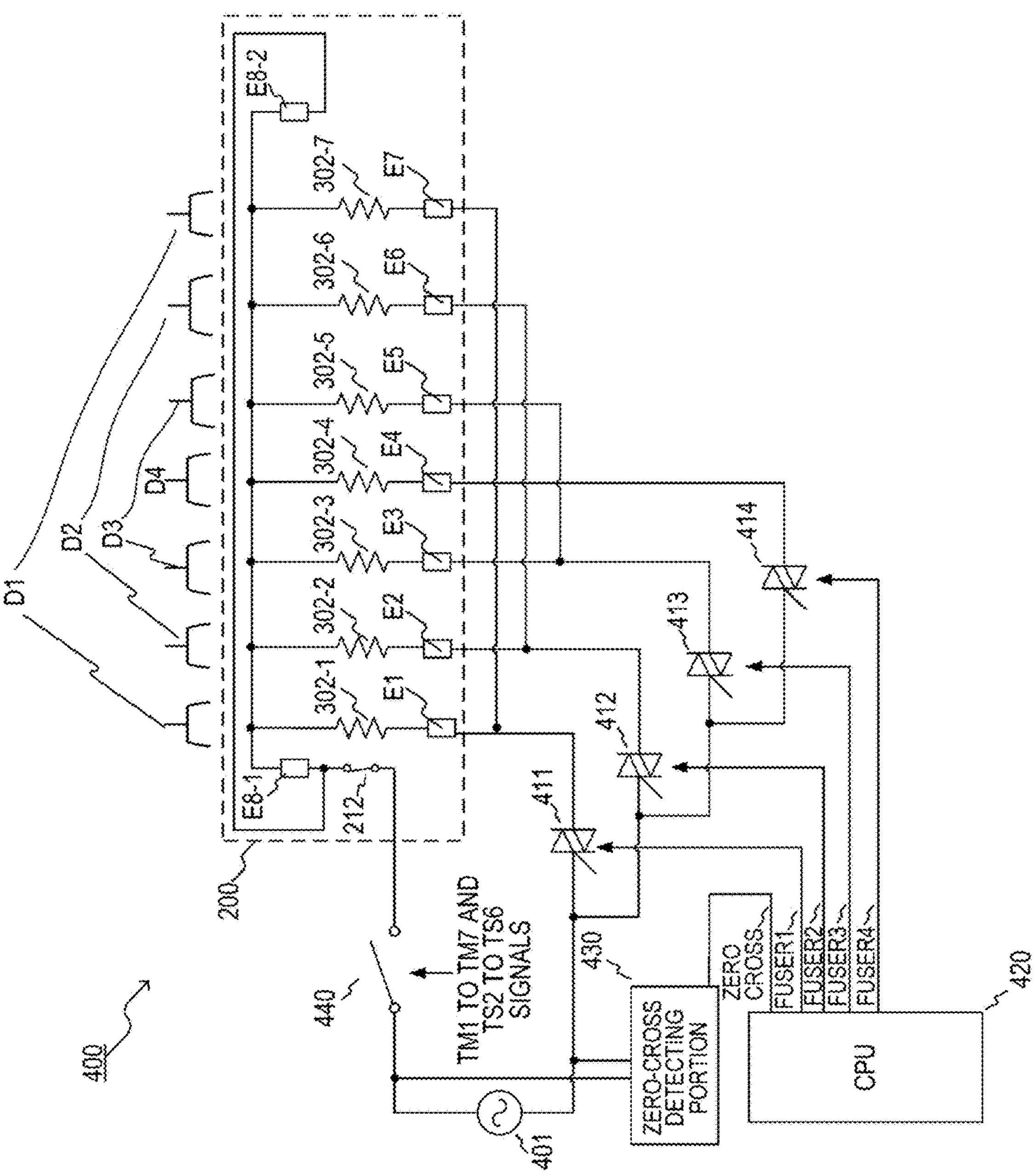
FIG. 4 is a heater control circuit diagram according to Embodiment 1.

FIG. 4 is a circuit diagram of the control circuit 400 of the heater 300 according to Embodiment 1. 401 indicates a commercial AC power supply that is connected to the image forming apparatus of Embodiment 1. The power control of the heater 300 is performed by turning triacs (power supply unit) 411 to 414 ON/OFF. The triacs 411 to 414 operate respectively in accordance with FUSER1 to FUSER4 signals from a CPU 420. The driving circuits of the triacs 411 to 414 are omitted in FIG. 4.

A heating element 302-*i* (i=1 to 7) collectively indicates the heating elements 302*a*-*i* (i=1 to 7) and 302*b*-1 (i=1 to 7). For example, the heating element 302-1 collectively indicates the heating elements 302*a*-1 and 302*b*-1.

In the circuit configuration according to Embodiment 1, the 7 heating blocks HB1 to HB7 are controlled by the 4 triacs 411 to 414. The triac 411 controls the heating blocks HB1 and HB7. The heating blocks HB1 and HB7 are collectively called a drive D1. The triac 412 controls the heating blocks HB2 and HB6. The heating blocks HB2 and HB6 are collectively called a drive D2. The triac 413 controls the heating blocks HB3 and HB5. The heating blocks HB3 and HB5 are collectively called a drive D3. The triac 414 controls the heating block HB4. The heating block HB4 is called a drive D4.

A zero-cross detecting portion 430 is a circuit to detect a zero-cross of the AC power supply 401, and outputs a ZEROCROSS signal to the CPU 420. The ZEROCROSS signal is used for detecting the timings of phase control and the wave number control of the triacs 411 and 414, for example.

A relay 440 is a unit for shutting the power supplied to the heater 300 OFF, in order to prevent overheating of the heater 300 due to a failure or the like. In a case where a predetermined overheating threshold is detected in any one of the main thermistors TM1 to TM7 and the sub-thermistors TS2 to TS6, the relay 440 shuts the power supplied to the heater 300 OFF.

In the internal processing of the CPU 420, power to be supplied to each drive (that is, control duty DTx[%] (x=1 to 4) is calculated at a predetermined calculation cycle. The control duty DTx is a value determined by the dividing power Wx[W] to be supplied to a drive Dx by the maximum power $Vin^2/Rx$[W] that can be supplied, and multiplying the result by 100, and is a value in the 0 to 100% range. Vin[V] is a value corresponding to the power supply voltage of the AC power supply 401, and is assumed to be 120[V] in Embodiment 1. Rx[Ω] is a combined resistance of the heating elements in the drive Dx.

In Embodiment 1, the control duty DTx is calculated based on the control target temperature TGTx (x=1 to 4) of each drive, and the detected temperature of the main thermistor TMx (x=1 to 4), by PID control (proportional integral control), for example. For the drives D1 and D3, however TM7 and TM5 may be used instead of the main thermistors TM1 and TM3.

In Embodiment 1, the thermistors TS2 to TS6 are not used for controlling the power supplied to each drive. These thermistors are used for the above mentioned overheat detection, and for detecting the temperature rising in non-paper passing portions, which occurs when the edge positions of the recording material in the longitudinal direction do not match with the separation positions of the heating region.

5. PID Control and Target Temperature

In Embodiment 1, the control duty DTx in the drive Dx is calculated by the following Formula 1 using deviation ΔTx (=TGTx−TMx), P gain Kp, I gain Ki, D gain Kd, and constant term (constant value) C.

$$Dx = Kp \times \Delta Tx + Ki \times \int \Delta Tx dt + Kd \times d\Delta Tx/dt + C \qquad \text{(Formula 1)}$$

The calculation cycle of Formula 1 is assumed to be 80 ms in Embodiment 1.

Furthermore, the control duty DTx is converted into a phase angle (phase control) or a wave number (wave number control) corresponding to the power, and the triacs 411 to 414 are controlled based on these control conditions.

FIG. 5 indicates parameter setting tables for the PID control according to Embodiment 1. The parameter setting tables indicate the parameters for PID control (Kp, Ki, Kd and C) in a paper passing zone which is a heating region where a recording material P passes (passing heating region), and a non-paper passing zone which is a heating region where a recording material P does not pass (non-passing heating region) respectively. In the paper passing zone, the constant term C is increased to 30 since the recording material P draws heat from members in the region, whereby a relatively higher control duty is generated compared with the later mentioned non-paper passing zone. In the non-paper passing zone, the constant term C is set to zero without increasing the value, since the recording material P accumulates heat without drawing heat from the elements in the region, whereby a relatively lower control duty is generated compared with the paper passing zone.

Figure 6A:
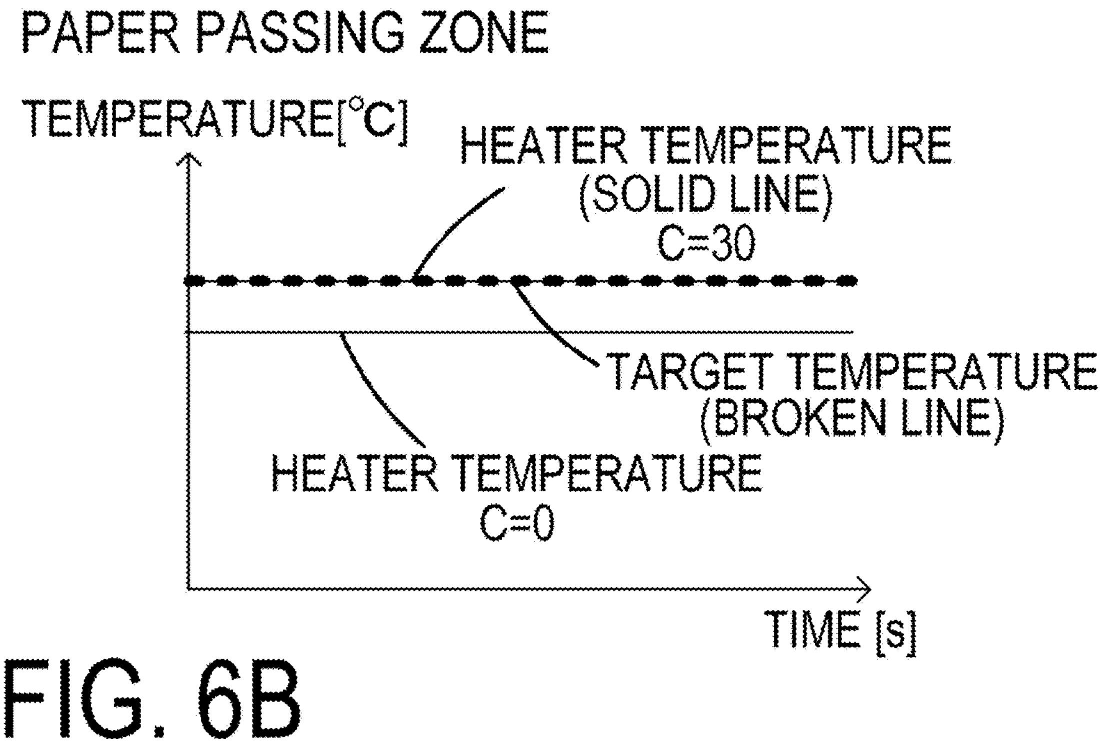
FIGS. 6A and 6B are diagrams depicting temperature transition by the PID control according to Embodiment 1.
Figure 6B:
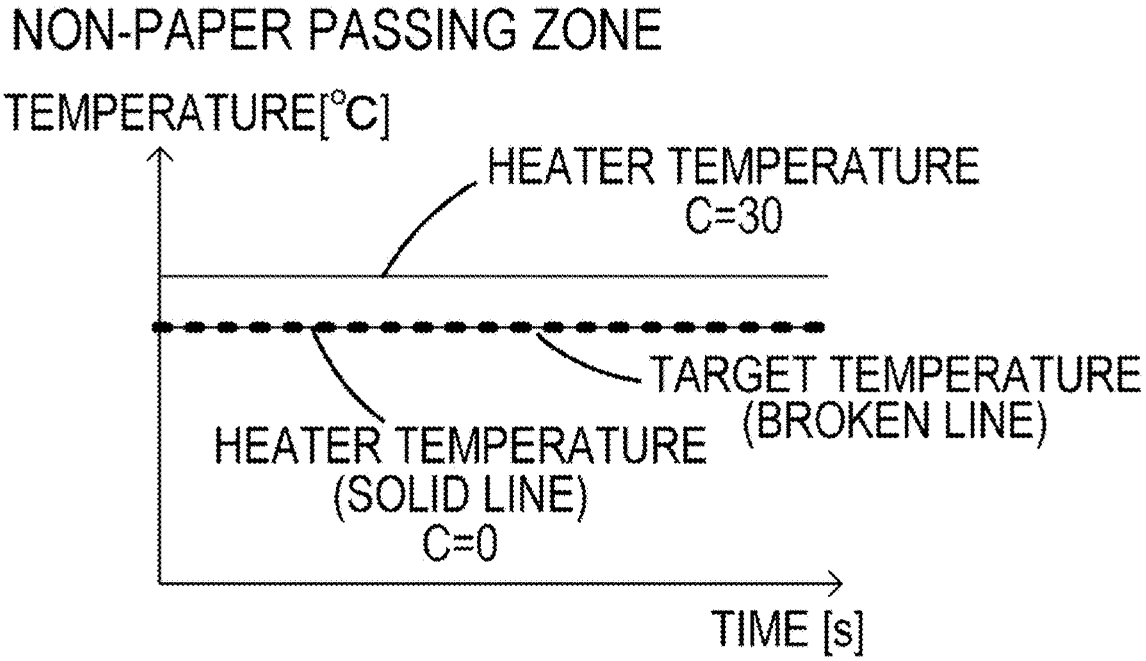

FIGS. 6A and 6B indicate temperature change in a case where temperature control was performed, setting C=0 for the paper passing zone, and C=30 for the non-paper passing zone. The solid line indicates a heater temperature, and the broken line indicates a target temperature. In the paper passing zone in FIG. 6A, the heater temperature follows the target temperature if C=30 is set. The change in heater temperature is lower than the target temperature if C=0 is set. In the non-paper passing zone in FIG. 6B, the heater temperature follows the target temperature if C=0 is set. The change in heater temperature is higher than the target temperature if C=30 is set.

In the configuration in Embodiment 1, the film surface temperature required for fixing Maxink 230% toner image (described later) to a standard paper as the recording material P is 180° C., and a desired film temperature can be acquired by controlling the heater at 240° C. in the paper passing zone.

In Embodiment 1, the non-paper passing zone is also controlled such that the film surface temperature becomes 180° C., just like the paper passing zone. This is because even if the subsequent recording material has a larger paper width than the previous recording material, the toner image on the subsequent recording material can be fixed without increasing the paper passing interval (conveyance interval in the case where a plurality of recording materials are consecutively passed through the fixing nip portion). In the non-paper passing zone, the film surface can be 180° C. if the heater temperature is controlled at 200° C., since elements accumulate heat without recording material drawing heat.

6. Correction of Target Temperature Based on Image Information

The video controller 120 in FIG. 1 acquires image density data from the received image data, converts the image density data into image information (later mentioned Maxink) used in the image forming apparatus, and sends the image information to the engine controller 113. This conversion method will be described next.

The video controller 120 converts the received image data into image density data of each color of C, M, Y and K. The image density data of each color of d(C), d(M), d(Y) and d(K) is expressed by a value in a range of the minimum density 00h (toner amount: 0%) to the maximum density FFh (toner amount: 100%) in accordance with the degree of occupancy of each color in a unit pixel area to specify density. In Embodiment 1, the unit pixel area is 16 dots×16 dots at 600 dpi. The sum d (CMYK) of this image density data of each color of d(C), d(M), d(Y) and d(K) is determined as the toner amount conversion value (%).

In Embodiment 1, 0.5 mg/cm$^2$ of toner amount on the recording material P is regarded as 100%, and the video controller 120 is adjusted such that the toner amount conversion value does not exceed 230%. The video controller 120 calculates the maximum value (Maxink) of the toner amount conversion value for each of the drives D1 to D4 respectively. For the drive D1, Maxink of the heating region HZ1 and the heating region HZ7 is calculated. For the drive D2, Maxink of the heating region HZ2 and the heating region HZ6 is calculated. For the drive D3, Maxink of the heating region HZ3 and the heating region HZ5 is calculated. For the drive D4, Maxink of the heating region HZ4 is calculated. Then Maxink (%) of each drive is notified to the engine controller 113.

The engine controller 113 corrects the target temperature of the paper passing zone in accordance with Maxink. Here the target temperature of the paper passing zone is set as a temperature in the case where Maxink is 230%. Therefore in the case where Maxink is 150%, the target temperature can be decreased by 10° C. compared with the case where Maxink is 230%. This is because less heat is required to sufficiently melt the toner as the toner amount decreases.

Table 1 indicates the correction temperature ΔTp of the target temperature based on Maxink.

TABLE 1

| Maxink [%] | Correction temperature ΔTp [° C.] |
|---|---|
| 0 | −20 |
| 1 to 20 | −18 |
| 21 to 51 | −15 |
| 51 to 100 | −12 |
| 101 to 150 | −10 |
| 151 to 180 | −5 |
| 181 to 200 | −2 |
| 201 to 230 | 0 |

7. Description on Mismatch of Paper Size

Figure 7:
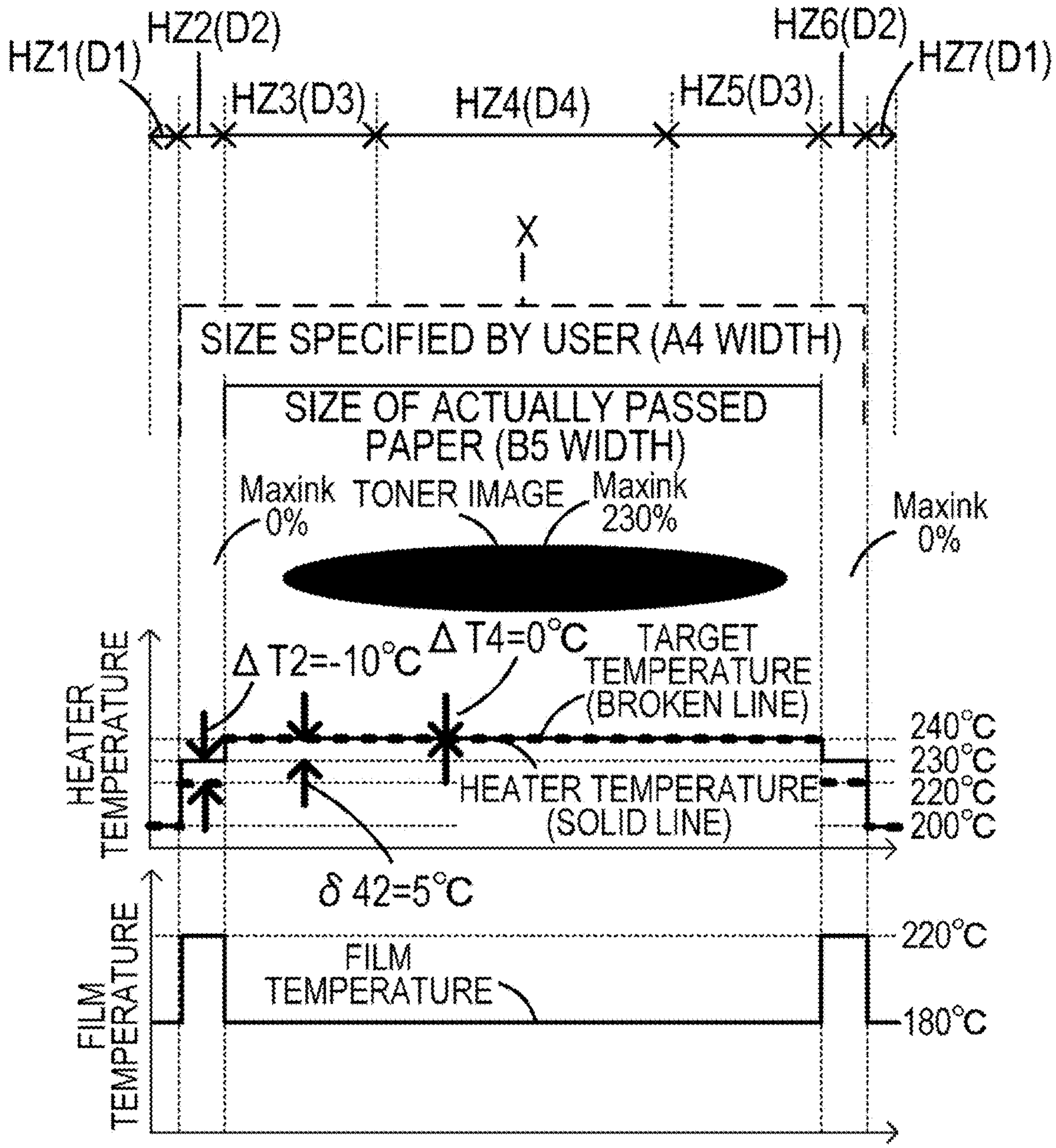
FIG. 7 is a diagram depicting temperature distribution in the case of specified paper width>actual paper width according to Embodiment 1.
Figure 8:
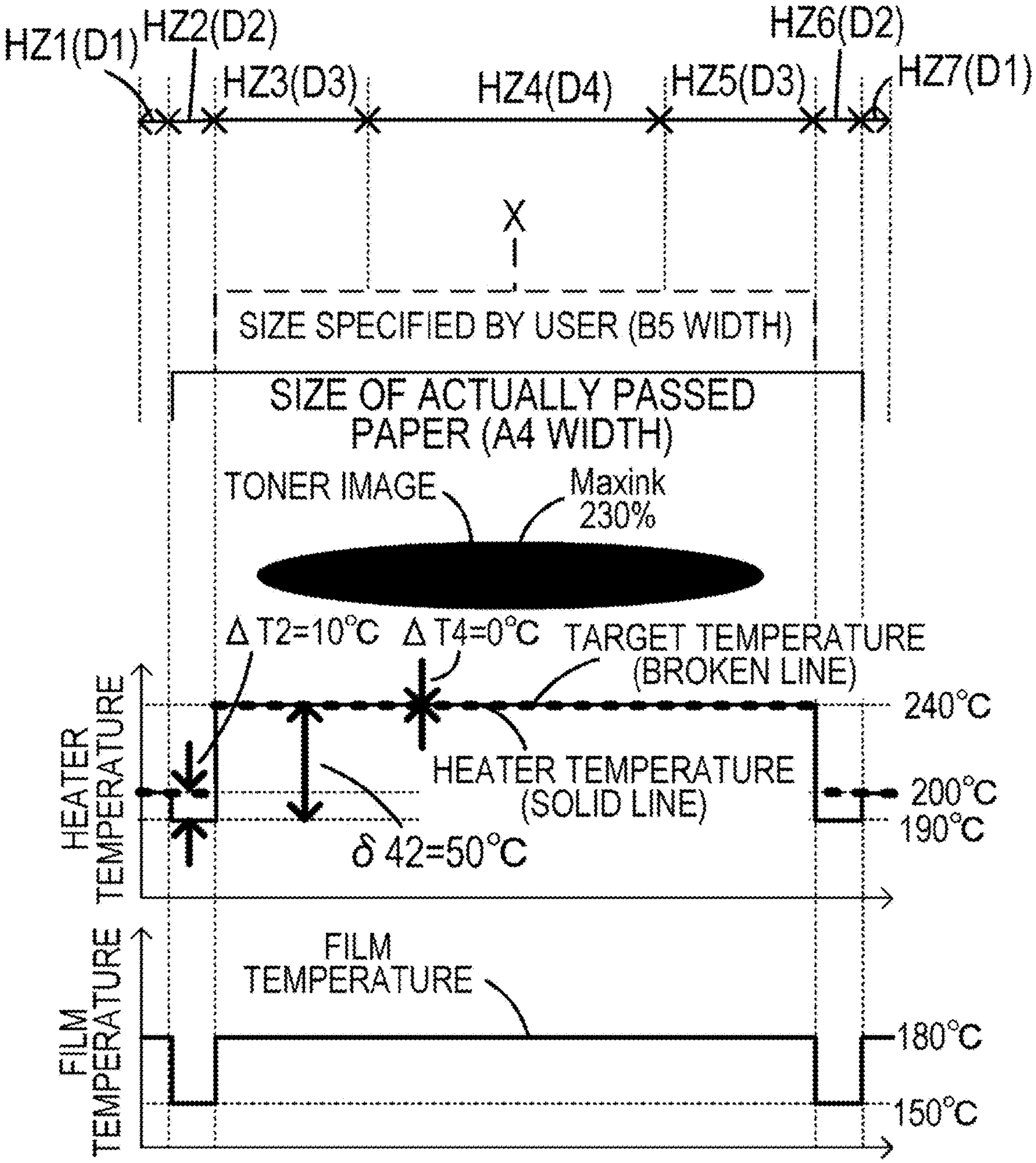
FIG. 8 is a diagram depicting temperature distribution in the case of specified paper width<actual paper width according to Embodiment 1.
Figure 9:
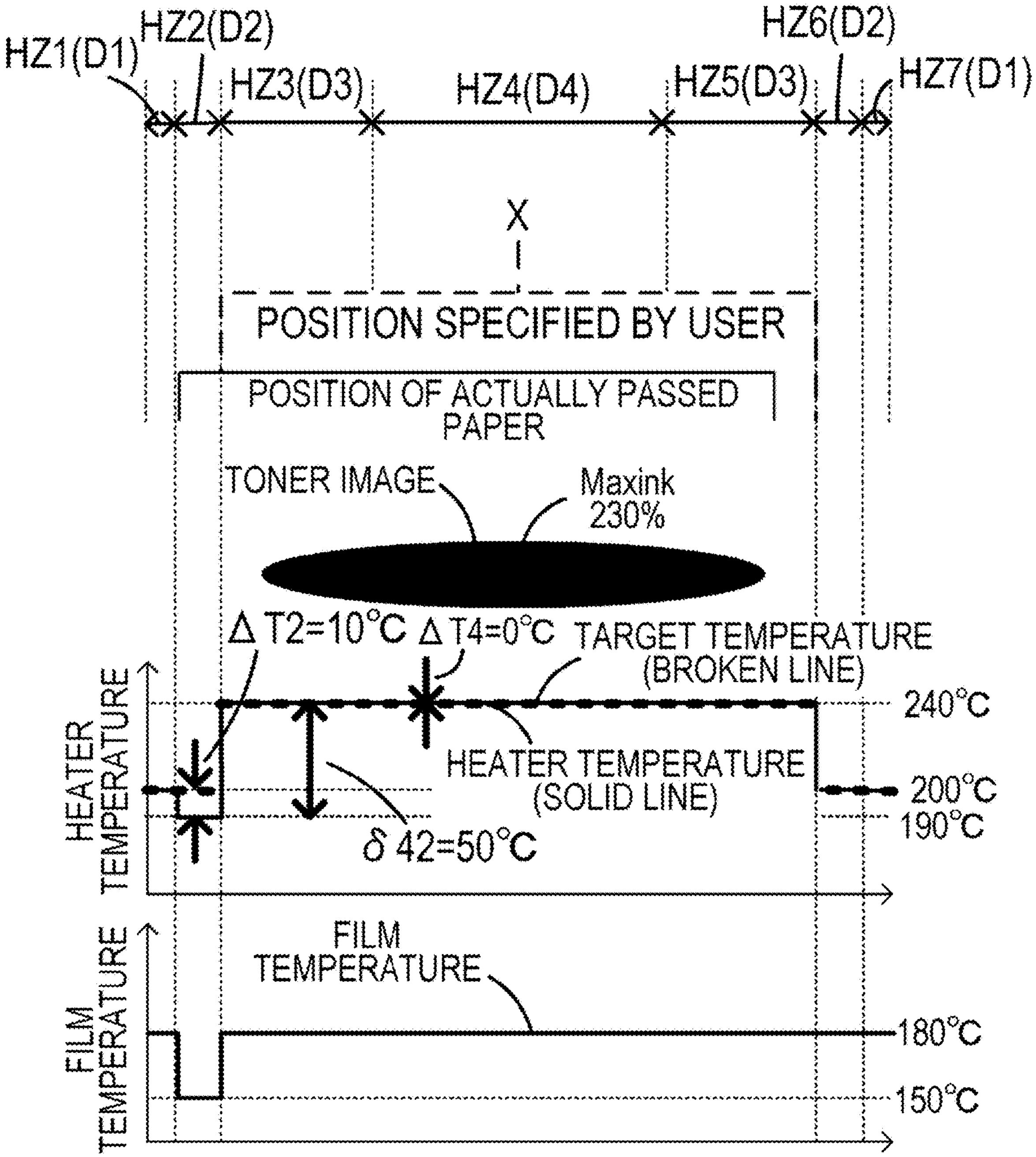
FIG. 9 is a diagram depicting a case of deviation according to Embodiment 1.

A temperature distribution in each member in the longitudinal direction of the heater, which is generated in the case where a paper size mismatch occurred in the fixing apparatus 200 according to Embodiment 1, will be described with reference to FIG. 7, FIG. 8 and FIG. 9. Here, as typical examples of a paper size mismatch, (i) a case where the paper width set by the user and the paper width of the paper that actually passed are different, and (ii) a case where the user passed the recording material in a position that deviated from the normal position (hereafter called "deviation"), will be described. FIG. 7, FIG. 8 and FIG. 9 indicate each temperature distribution after the later mentioned paper size mismatch is determined, and before performing a predetermined prevention control based on the paper size mismatch determination. In the graph on the temperature distribution of the heater temperature in the longitudinal direction, the solid line indicates the heater temperature (temperature of the heater actually detected by the temperature detecting portion), and the broken line indicates the target temperature (control target temperature of the heater that is set based on the recording material information).

FIG. 7 is a temperature distribution in a case where the paper size which the user specified via an external device or via the operation panel 130 is A4, and the paper size of the paper that actually passed has a B5 width. Based on the width information of the recording material and the image information acquired from the image forming apparatus, the target temperature of the drives D2 to D4, which are paper passing zones, are set to a 220° C. to 240° C. range. The recording material information that is acquired before the fixing operation includes a predetermined size of the recording material to be passed through the fixing nip portion, and a predetermined position of the recording material in the longitudinal direction when the recording material passes through the fixing nip portion. Based on the recording material information, the control portion, to control the fixing apparatus 200, sets each control target temperature for a plurality of heating regions, which are heated by a plurality of heating elements disposed in the longitudinal direction of the heater 300 respectively, and individually controls heating of the plurality of heating elements in accordance with the control target temperature that was set.

For the drives D3 and D4, of which Maxink is 230%, the target temperature is set to 240° C. For the drive D2, of which Maxink is 0%, on the other hand, the target temperature is set to 240° C.−20° C.=220° C., since Δtp=−20° C., as indicated in Table 1. The drive D1, which is the non-paper passing zone, is controlled to 200° C. (the target temperature of the non-paper passing zone).

The drive D2 is normally a paper passing zone, but is actually a non-paper passing zone here. Hence in the drive D2, the target temperature is 220° C., which is 20° C. higher than the normal target temperature 200° C. of a non-paper passing zone. Further, in the drive D2, the parameter setting for the PID control is that of the paper passing zone, therefore excessive power for the non-paper passing zone is supplied, and the heater temperature becomes 230° C., which overshoots the target temperature 220° C. by 10° C. This means that in the drive D2, the temperature of the fixing film 202 becomes close to 220° C., and overheat is generated locally with respect to the other drives. If the thermal expansion of the pressure roller 208 locally becomes large in such a high temperature portion, a conveying failure may occur to the recording material P. Further, if the heat resistant temperature of the fixing film 202 (220° C.) is exceeded, the fixing film 202 may be damaged.

FIG. 8 is a temperature distribution in a case where the paper size which the user specified via an external device or via the operation panel 130 is B5, and the paper size of the paper that actually passed has an A4 width. According to the width information of the recording material and the image information acquired from the image forming apparatus, the target temperatures of the drives D3 and D4, which are the paper passing zones and of which Maxink is 230%, are set to 240° C. The drives D1 and D2, which are non-paper passing zones, are controlled to 200° C. (the target temperature of the non-paper passing zone).

The drive D2 is normally a non-paper passing zone, but is actually a paper passing zone here with a Maxink 0%, and the target temperature thereof is 200° C., which is 20° C. lower than the normal target temperature 220° C. of a paper passing zone with Maxink 0% (=240° C.−20° C.). Further, in the drive D2, the parameter setting for the PID control is that of the non-paper passing zone, therefore power supply becomes insufficient for a paper passing zone, hence the heater temperature becomes 190° C., which undershoots the target temperature 200° C. by 10° C. This means that in the drive D2, the temperature of the fixing film 202 becomes close to 150° C., and underheat is generated locally with respect to the other drives. If the thermal expansion of the pressure roller 208 locally becomes small compared with the surrounding in such a low temperature portion, a conveying failure may occur to the recording material P.

FIG. 9 is a temperature distribution in a case where the paper size which the user specified via an external device or via the operation panel 130 is B5, and the paper actually deviated toward the left side in FIG. 9. According to the width information of the recording material and the image information acquired from the image forming apparatus, the target temperatures of the drives D3 and D4, which are the paper passing zones and of which Maxink is 230%, are set to 240° C. The drives D1 and D2, which are non-paper passing zones, are controlled to 200° (the target temperature of the non-paper passing zone).

The heating region HZ2, which belongs to the drive D2, is normally a non-paper passing zone, but is actually a paper passing zone here with Maxink 0%. The heating region HZ6 is a non-paper passing zone as it should be. In the heating region HZ2, the target temperature is 200° C., which is 20° C. lower than the normal target temperature 220° C. of the paper passing zone with Maxink 0% (=240° C.−20° C.). Further, in the heating region HZ2, the parameter setting for the PID control is that of the non-paper passing zone, therefore power supply to the paper passing zone becomes insufficient, hence the heater temperature becomes 190° C., which undershoots the target temperature 200° C. by 10° C. This means that in the heating region HZ2, the temperature of the fixing film 202 becomes close to 150° C., and underheat is generated locally with respect to the other drives. If the thermal expansion of the pressure roller 208 locally becomes small compared with the surroundings in such a low temperature portion, a conveying failure may occur to the recording material P.

8. Paper Size Mismatch Determination Method

In Embodiment 1, to solve the above problem, it is determined whether the paper width specified by the user is different from the actual paper width, using a temperature difference of the main thermistors between the drive D4 (heating region HZ4) where the conveyance reference position X passes and the other drives Dx (heating region HZx).

The method for determining whether the paper width specified by the user is different from the actual paper width according to Embodiment 1 will be described with reference to the flow chart in FIG. 10.

When printing starts, processing advances to S101, and the engine controller 113 acquires the paper width information from the video controller 120.

In S102, based on the acquired paper width information, it is determined whether each drive Dx (x=1, 2, 3) corresponding to the heating region HZx, where the conveyance reference position X does not pass, is a paper passing zone (paper passing portion), or a non-paper passing zone (non-paper passing portion).

If the determination in S102 is a paper passing portion, processing advances to S103, and it is determined whether a difference between the temperature of the main thermistor TM4 of the drive D4 and the temperature of the main thermistor TMx of the drive Dx, that is, δ4$x$ (=TM4−TMx), is a predetermined threshold δth1 or less. The threshold δth1 has been set to a value determined by subtracting 5° C. from the difference between the target temperature of the drive D4 and the target temperature of the drive Dx, that is, (TGT4−TGTx−5° C.). The difference δ4$x$ that is not more than a predetermined threshold means that in the state where the temperature of the main thermistor TM4 of the drive D4 is controlled to be around the target temperature TGT4, the temperature of the main thermistor TMx of the drive Dx overshoots the target temperature TGTx by at least 5° C.

The determination in S103 here means determining whether the value of the difference between the difference of the target temperature TGTx and the temperature of the main thermistor TMx in the drive Dx, and the difference of the target temperature TGT4 and the temperature of the main thermistor TM4 in the drive D4, is within a predetermined range. In other words, the heating region where the conveyance reference position is included is a heating region where the recording material passes with certainty, hence the difference of the control target temperature and the detected temperature in this heating region can be regarded as a reference difference, in order to determine whether another heating region is a paper passing region or a non-paper passing region. Therefore if the difference of the control target temperature and the detected temperature in another heating region is the same as or similar to the reference difference, it can be determined that the detected temperature has not deviated from the control target temperature, and that the specification of a paper passing region or a non-paper passing region based on the recording material information is correct. On the other hand, if the difference of the control target temperature and the detected temperature in another heating region has deviated considerably from the reference difference, then it can be determined that the specification of a paper passing region or a non-paper passing region based on the recording material information does not match with the paper passing state of the actual recording material.

If the determination in S103 is no, processing advances to S104, and the drive Dx is determined as the paper passing zone, then printing continues. If the determination in S103 is yes, on the other hand, processing advances to S105, and the drive Dx is determined as the non-paper passing zone, then the overheat prevention control is performed. In Embodiment 1, the overheat prevention control is performed by increasing the paper passing interval (conveyance interval when a plurality of recording materials consecutively pass the fixing nip portion) to more than usual or more than the state before the mismatch determination is performed, and then printing continues.

If the determination in S102 is a non-paper passing portion, processing advances to S106, and it is determined whether a difference between the temperature of the main thermistor TM4 of the drive D4 and the temperature of the main thermistor TMx of the drive Dx, that is, δ4$x$ (=TM4−TMx), is equal to or more than a predetermined threshold δth2. The threshold δth2 has been set to a value determined by adding 5° C. to the difference between the target temperature of the drive D4 and the target temperature of the drive Dx, that is, (TGT4−TGTx+5° C.). The difference δ4$x$ that is equal to or more than the predetermined threshold means that in the state where the temperature of the main thermistor TM4 of the drive D4 is controlled to be around the target temperature TGT4, the temperature of the main thermistor TMx of the drive Dx overshoots the target temperature TGTx by at least 5° C.

If the determination in S106 is no, processing advances to S107, and the drive Dx is determined as the non-paper passing zone, then printing continues. If the determination in S106 is yes, on the other hand, processing advances to S108, and the drive Dx is determined as the paper passing zone, then underheat prevention control is performed. In Embodiment 1, the underheat prevention control is performed by increasing the paper passing interval to more than usual, or to more than the state before the mismatch determination is performed, and then printing continues. The determination and operation in S102 to S108 are repeated for each drive Dx (x=1, 2, 3) as well.

9. Examples and Effects of Paper Size Mismatch Determination

Determination results and effects in the case of applying the determination method in FIG. 10 to the cases in FIG. 7, FIG. 8 and FIG. 9 will be described next.

Figure 10:
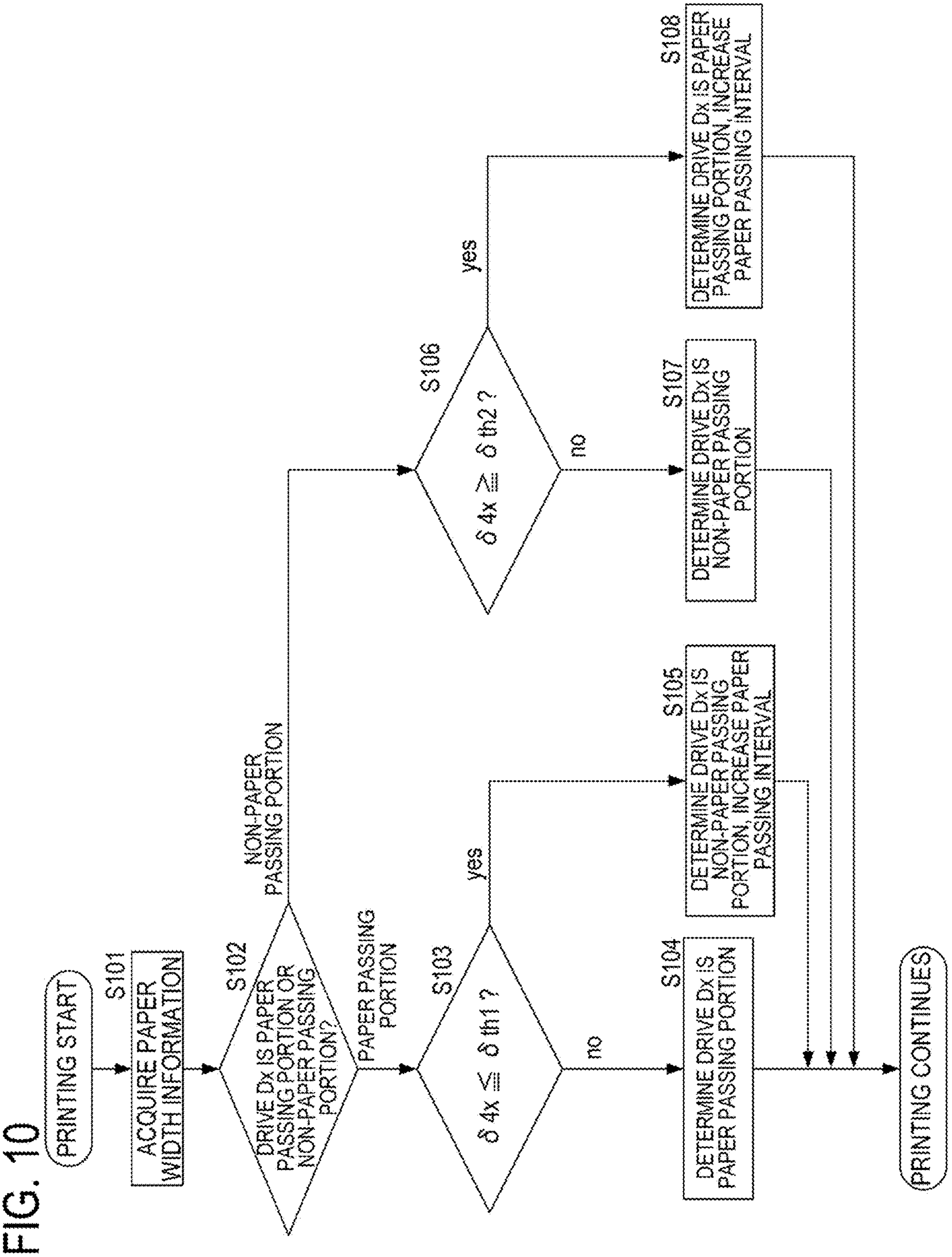
FIG. 10 is a flow chart to determine paper width according to Embodiment 1.

In the case of FIG. 7, the drive D2 is set as the paper passing zone, but is determined as the non-paper passing zone when the determination flow in FIG. 10 is applied. The actual difference δ42 between the temperature of the main thermistor TM4 of the drive D4 and the temperature of the main thermistor TM2 of the drive D2 is calculated as δ42=240° C.−230° C.=10° C. The threshold δth1, on the other hand, is calculated as δth1=TGT4−TGT2−5° C.=240° C.−220° C.−5° C.=15° C. Therefore δ42≤δth1, that is, [the drive D2] is determined as the non-paper passing zone, and the paper passing interval is increased.

Figure 11:
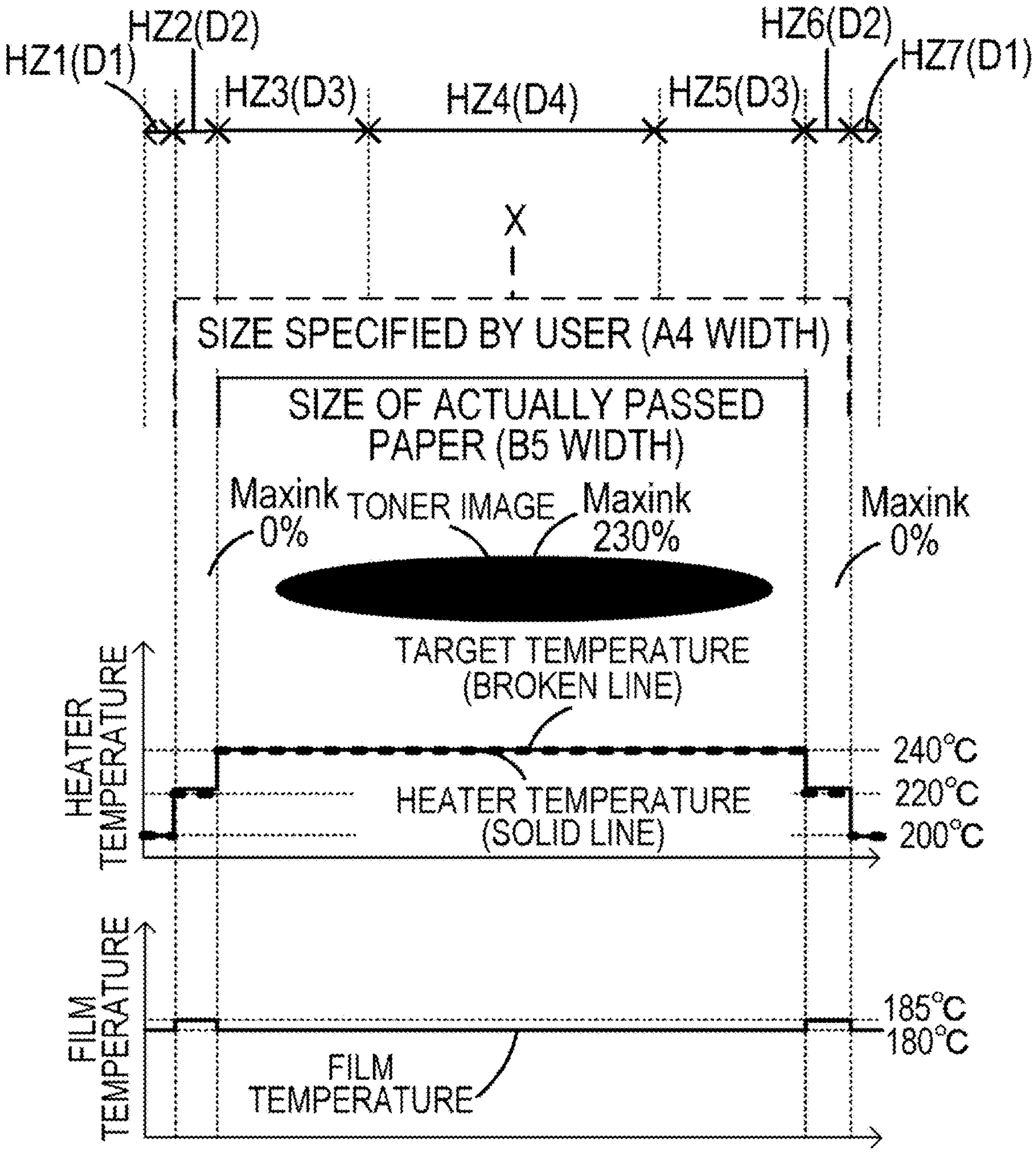
FIG. 11 is a diagram depicting an effect in the case of passing paper, of which paper width is smaller than the specified size, according to Embodiment 1.

In Embodiment 1, in a block where the recording material does not pass in the fixing apparatus 200 between the preceding recording material and the subsequent recording material (hereafter paper interval), all the drives Dx become the non-paper passing zones, hence the target temperatures thereof are set to 200° C. This means that the temperature of the fixing film 202 is uniformly heated in the longitudinal direction. As a result, the temperature distribution becomes as indicated in FIG. 11, where the temperature can be maintained to not more than the temperature at which a conveying failure of the recording material and damage are generated.

In the case of FIG. 8, the drive D2 is set as the non-paper passing zone, but is determined as the paper passing zone when the determination flow in FIG. 10 is applied. The actual difference δ42 between the temperature of the main thermistor TM4 of the drive D4 and the temperature of the main thermistor TM2 of the drive D2 is calculated as δ42=240° C.−190° C.=50° C. The threshold δth2, on the other hand, is calculated as δth2=TGT4−TGT2+5° C.=240° C.−200° C.+5° C.=45° C. Therefore δ42≥δth2, that is, the drive D2 is determined as the paper passing zone, and the paper passing interval is increased.

Figure 12:
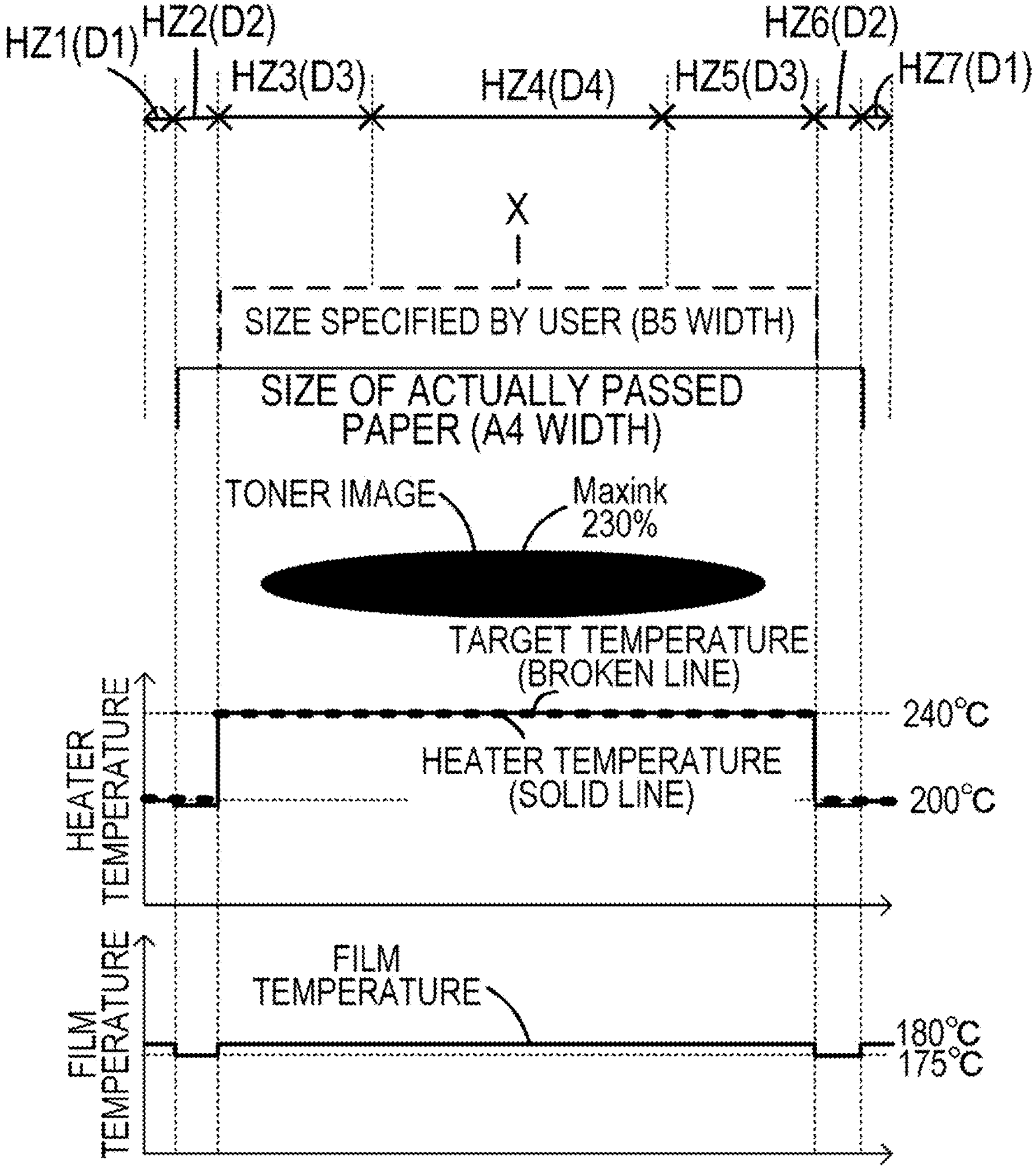
FIG. 12 is a diagram depicting an effect in the case of passing paper, of which paper width is larger than the specified size, according to Embodiment 1.

In the paper interval, the temperature of the fixing film 202 is uniformly heated in the longitudinal direction, and becomes the temperature distribution indicated in FIG. 12, where the temperature difference in the longitudinal direction can be maintained to not more than the temperature difference at which the conveying failure of the recording material and damage are generated.

In the case of FIG. 9, the drive D2 is set as the non-paper passing zone, but is determined as the paper passing zone when the determination flow in FIG. 10 is applied. The actual difference δ42 between the temperature of the main thermistor TM4 of the drive D4 and the temperature of the main thermistor TM2 of the drive D2 is calculated as δ42=240° C.−190° C.=50° C. The threshold δth2, on the other hand, is calculated as δth2=TGT4−TGT2+5° C.=240° C.−200° C.+5° C.=45° C. Therefore δ42≥δth2, that is, the drive D2 is determined as the paper passing zone, and the paper passing interval is increased.

Figure 13:
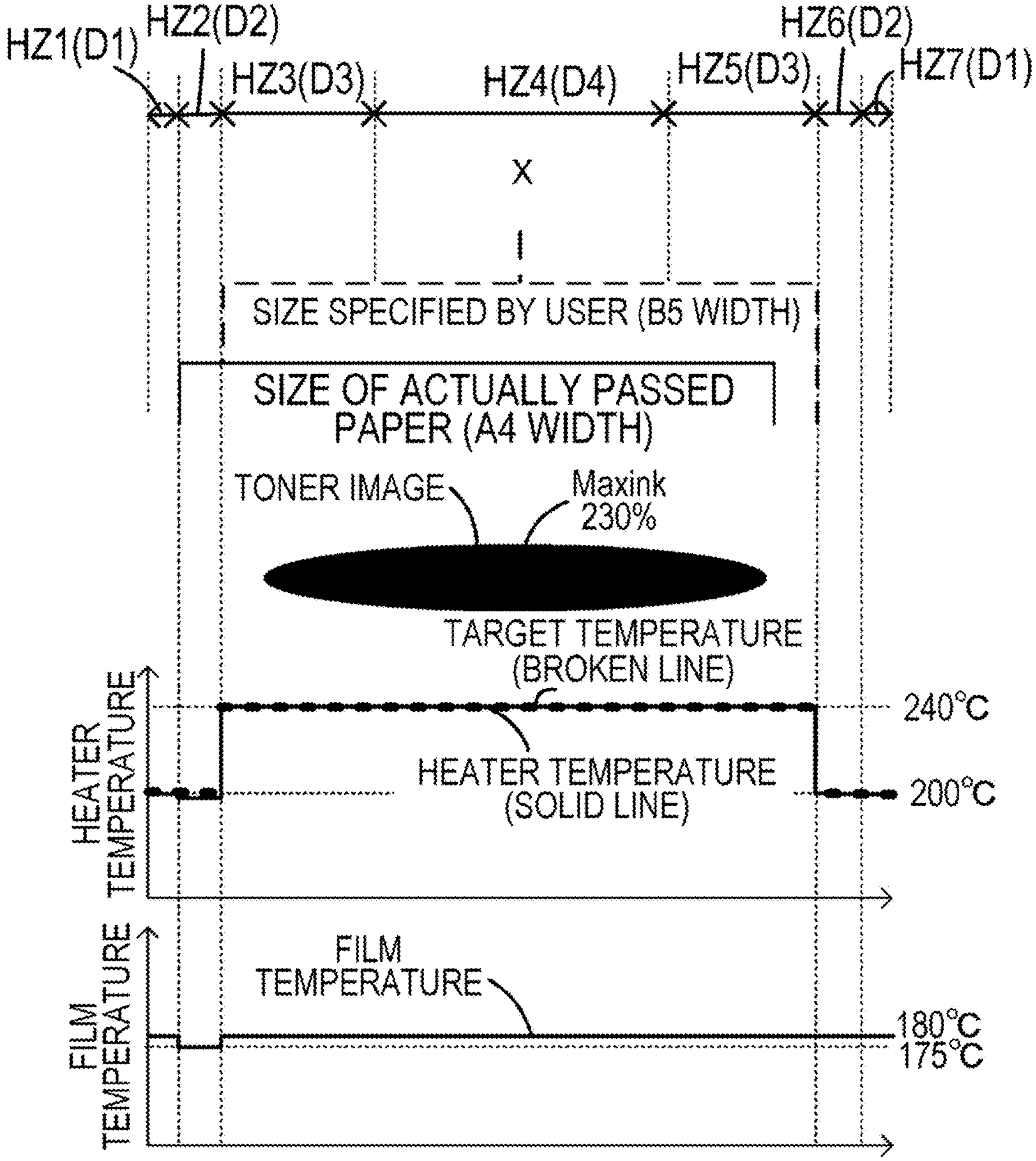
FIG. 13 is a diagram depicting an effect in the case of passing deviated paper according to Embodiment 1.

In the paper interval, the temperature of the fixing film 202 is uniformly heated in the longitudinal direction, and becomes the temperature distribution indicated in FIG. 13, where the temperature difference in the longitudinal direction can be maintained to not more than the temperature difference at which the conveying failure of the recording material and damage are generated.

Embodiment 2

In Embodiment 2 of the present invention, the control conditions for the PID temperature control are changed instead of increasing the paper passing interval after the paper size mismatch is determined, which is the difference from Embodiment 1. Description on the configuration the same as Embodiment 1 will be omitted.

1. Paper Size Mismatch Determination Method

The method for determining whether the paper width specified by the user is different from the actual paper width according to Embodiment 2 will be described with reference to the flow chart in FIG. 14. S201 to S204, S206 and S207 are the same as S101 to S104, S106 and S107 in FIG. 9, hence description thereof will be omitted.

If the determination in S203 is yes, processing advances to S205, and the drive Dx is determined as the non-paper passing zone, then the target temperature is changed to 200° C. which is the value for the non-paper passing zone, the parameter setting for the PID control is changed to the setting for the non-paper passing zone in FIG. 5, and printing continues.

If the determination in S206 is yes, processing advances to S208, and the drive Dx is determined as the paper passing zone, then the target temperature is changed to 220° C., which is a value equivalent to Maxink 0% of the paper passing zone, the parameter setting for the PID control is changed to the setting for the paper passing zone in FIG. 5, and printing continues. The determination and operation in S202 to S208 are repeated for each of the other drives Dx (x=1, 2, 3) as well.

2. Examples and Effects of Paper Size Mismatch Determination

Determination results and effects in the case of applying the determination method in FIG. 14 to the cases in FIG. 7 and FIG. 8 will be described.

Figure 14:
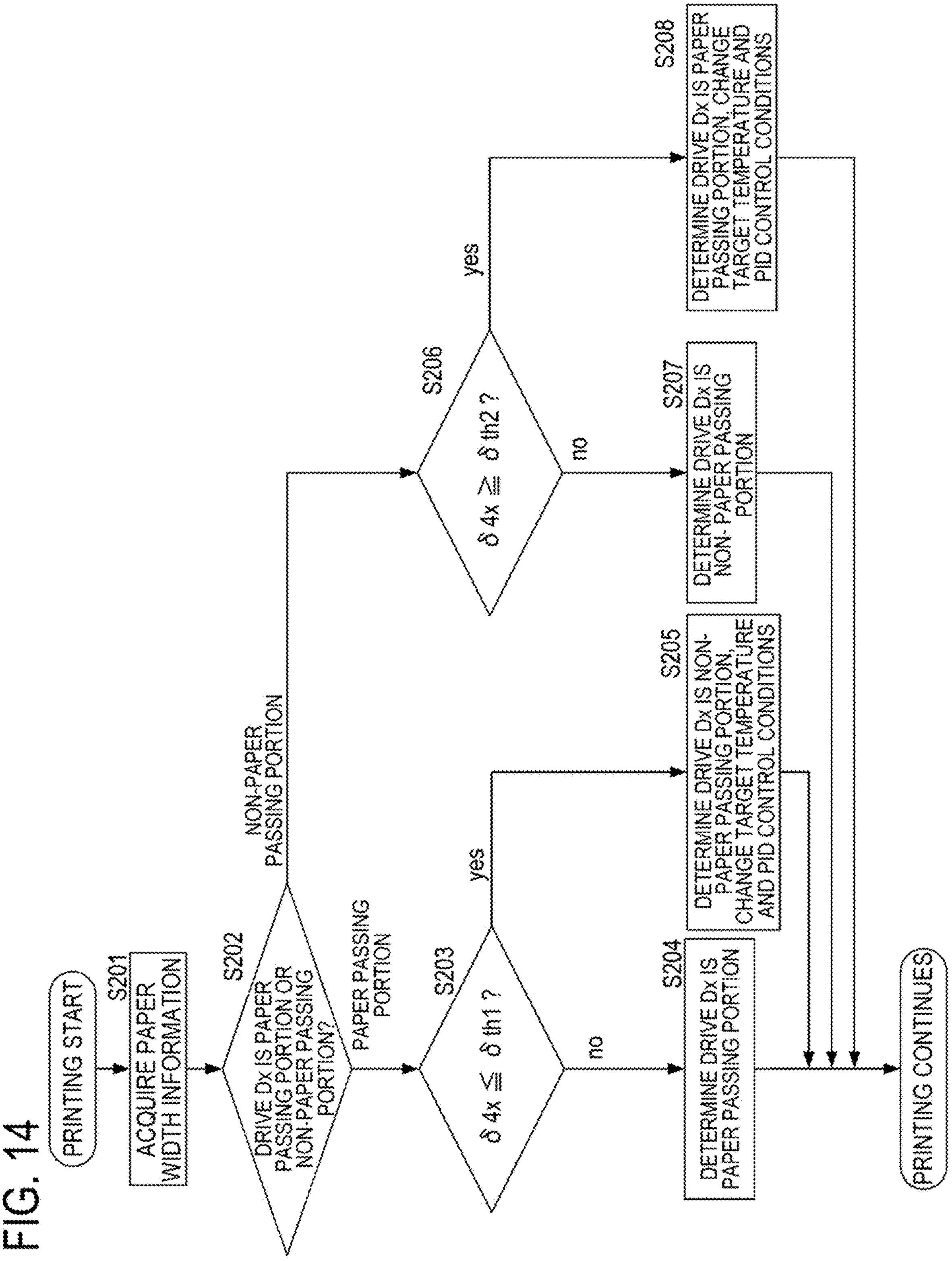
FIG. 14 is a flow chart to determine paper width according to Embodiment 2.
Figure 15:
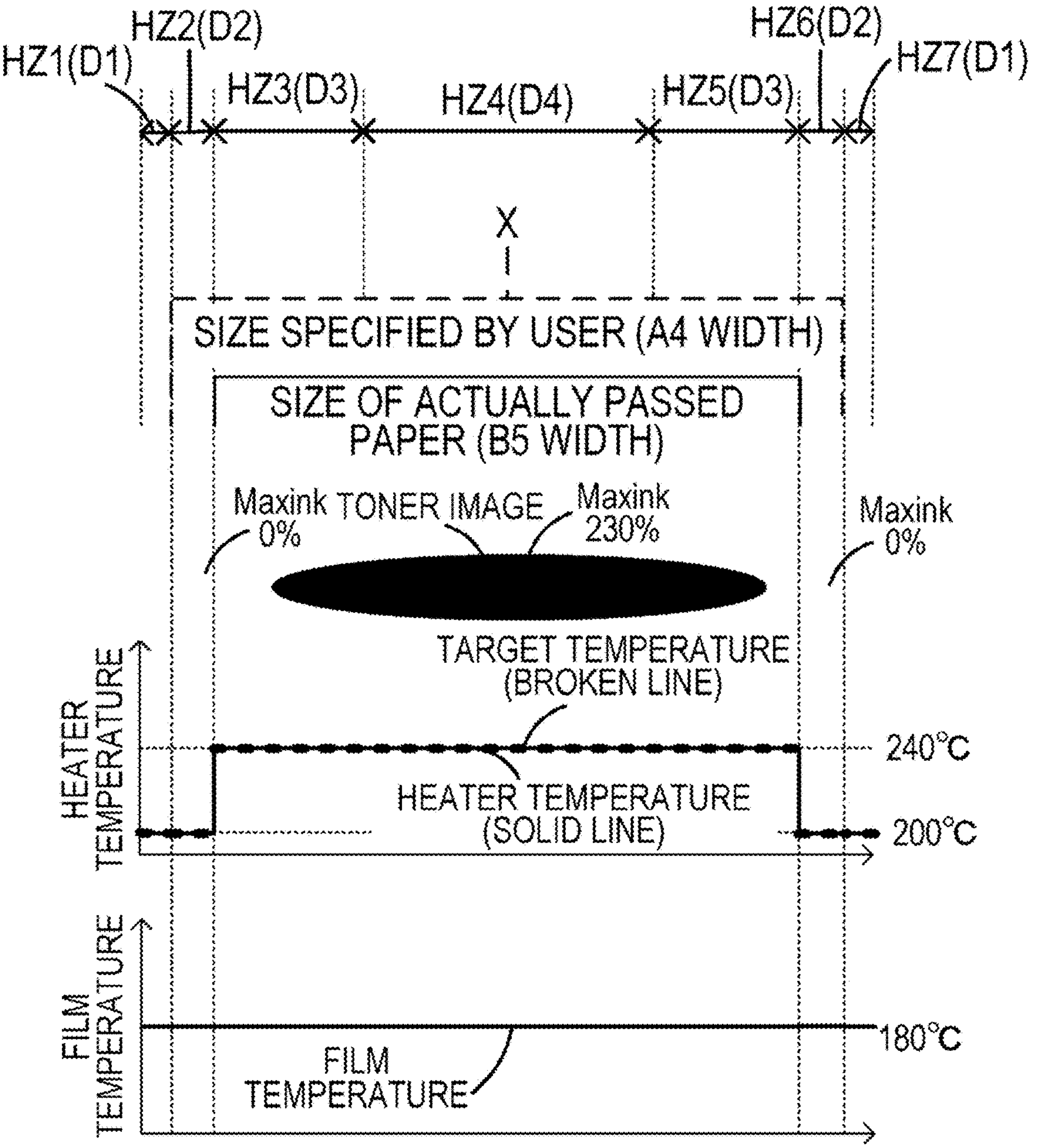
FIG. 15 is a diagram depicting an effect in the case of passing paper, of which paper width is smaller than the specified size, according to Embodiment 2.

In the case of FIG. 7, the drive D2 is set as the paper passing zone, but is determined as the non-paper passing zone when the determination flow in FIG. 14 is applied, and the target temperature is changed to 200° C., which is the value for the non-paper passing zone, and the parameter setting for the PID control is changed to the setting for the non-paper passing zone. Thereby the overheat of the fixing film 202 in the drive D2 is prevented, and dispersion of the temperature in the longitudinal direction is reduced. As a result, the temperature distribution becomes as indicated in FIG. 15, and the temperature can be maintained to not more than the temperature at which conveying failure of the recorded material and damage can be generated.

Figure 16:
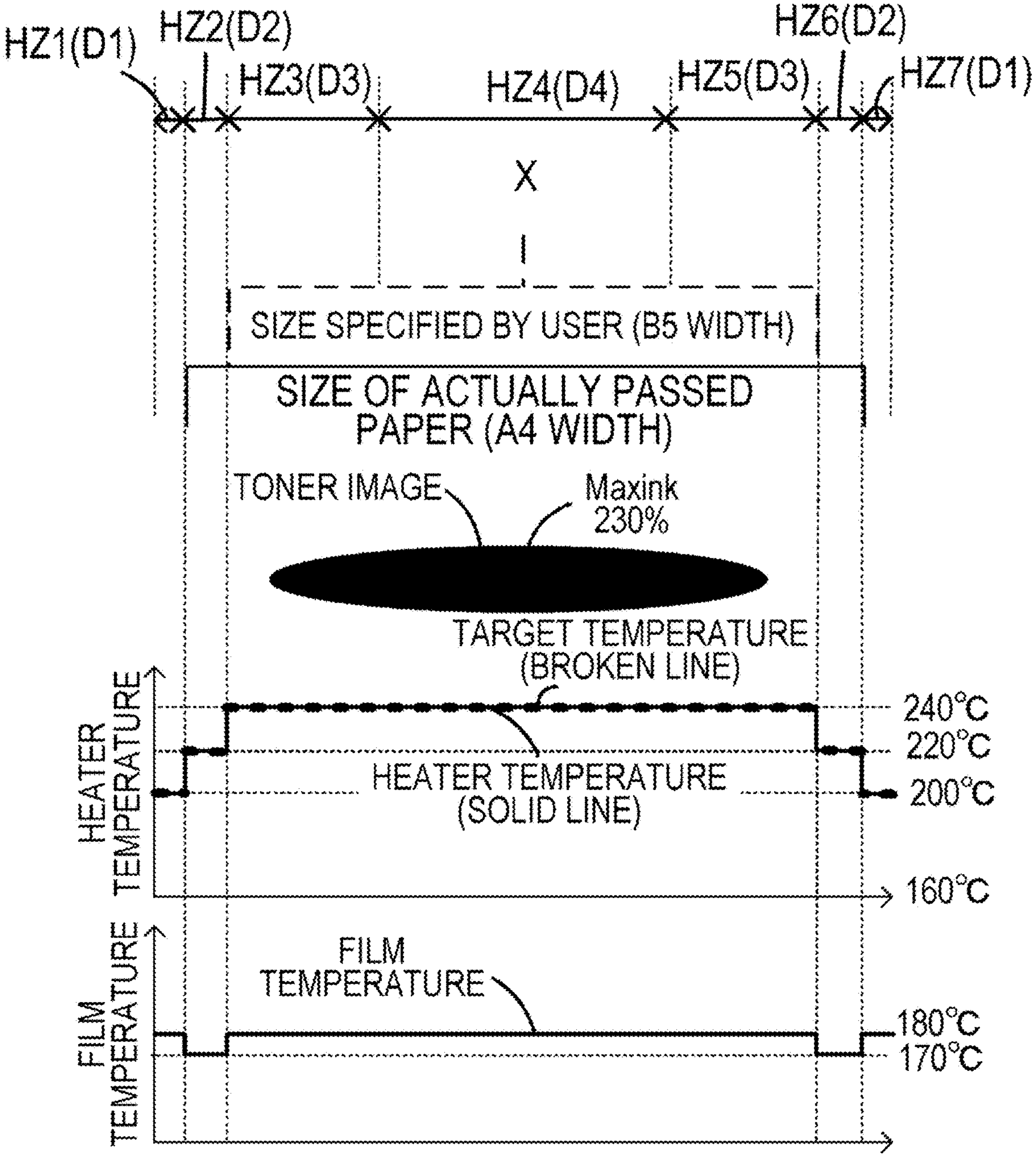
FIG. 16 is a diagram depicting an effect in the case of passing paper, of which paper width is larger than the specified size, according to Embodiment 2.

In the case of FIG. 8, the drive D2 is set as the non-paper passing zone, but is determined as the paper passing zone when the determination flow in FIG. 14 is applied, and the target temperature is changed to 220° C., which is a value corresponding to Maxink 0% of the paper passing zone, and the parameter setting of the PID control is changed to that of the paper passing zone. Thereby dispersion of the temperature of the fixing film 202 in the longitudinal direction is reduced. As a result, the temperature distribution becomes as indicated in FIG. 16, and the temperature difference in the longitudinal direction can be maintained to not more than the temperature difference at which conveying failure of the recording material and damage can be generated.

The supply power (control duty) to the determined heating region is calculated using the above mentioned control duty calculation formula (Formula 1). In other words, the control duty is calculated as follows by the addition of: a difference ΔTB between a control target temperature TtgtB of the determination target heating region and the detected temperature TB of the determination target heating region; PID control values based on the P gain Kp, I gain Ki and D gain Kd; and a predetermined constant value C. The supply power can be changed by adjusting at least one of P gain Kp, I gain Ki, D gain Kd and constant value C.

$$Kp \times \Delta TB + Ki \times \int \Delta TBdt + Kd \times d\Delta TB/dt + C$$

3. Modification

In Embodiment 2, power control is performed for the heating blocks disposed at bilateral symmetric positions as one drive. Therefore if the recording material deviates as indicated in FIG. 9, and the parameters for PID control are changed based on the determination that the drive D2 is in the paper passing zone, then the heating region HZ6, which is normally the non-paper passing zone, is determined as the paper passing zone, and overheat may be generated. In such a case where overheat is concerned, the left and right heating blocks may be controlled by drives independent from each other. If the heating region HZ6 can be handled as a drive D6, which is different from the drive D2, the drive D2 can be determined as the paper passing zone, and the drive D6 can be determined as the non-paper passing zone, hence the generation of overheat in the heating region HZ6 can be prevented.

Embodiment 3

In Embodiment 3 of the present invention, the paper size mismatch is determined not by using the temperature difference of the main thermistor of the drive where the conveyance reference position X passes and those of other drives, but by using a deviation of the target temperature and the temperature of the main thermistor of a drive where the conveyance reference position X does not pass, which is the difference from Embodiment 1. Description on the configuration the same as Embodiment 1 will be omitted.

1. Paper Size Mismatch Determination Method

The method for determining whether the paper width specified by the user is different from the actual paper width according to Embodiment 3 will be described with reference to the flow chart in FIG. 17. S301, S302, S304, S305, S307 and S308 are the same as S101, S102, S104, S105, S107 and S108 in FIG. 10, hence description thereof will be omitted.

If the determination in S302 is the paper passing portion, processing advances to S303, and the deviation of the target temperature TGTx and the temperature of the main thermistor TMx of the drive Dx, that is, ΔTx=TGTx−TMx is calculated, and it is determined whether ΔTx is not more than a predetermined threshold Δth1. The threshold Δth1 is set to −5° C. in Embodiment 3. The deviation ΔTx that is not more than the threshold Δth1 means that the temperature of the main thermistor TMx of the drive Dx overshoots the target temperature TGTx by at least 5° C.

The determination in S303 can be regarded as the determination in S103 of Embodiment 1, where the difference between the target temperature TGT4 and [the temperature of] the main thermistor TM4 in the drive D4 is determined as zero.

If the determination in S303 is the non-paper passing portion, processing advances to S306, and the deviation ΔTx is calculated, then it is determined whether the deviation ΔTx is equal to or more than a predetermined threshold Δth2. The threshold Δth2 is set to 5° C. in Embodiment 3. The deviation ΔTx that is equal to or more than the threshold Δth2 means that the temperature of the main thermistor TMx of the drive Dx undershoots the target temperature TGTx by at least 5° C. The determination and operation in S302 to S308 are repeated for each drive Dx (x=1, 2, 3) as well.

2. Examples and Effects of Paper Size Mismatch Determination

Figure 17:
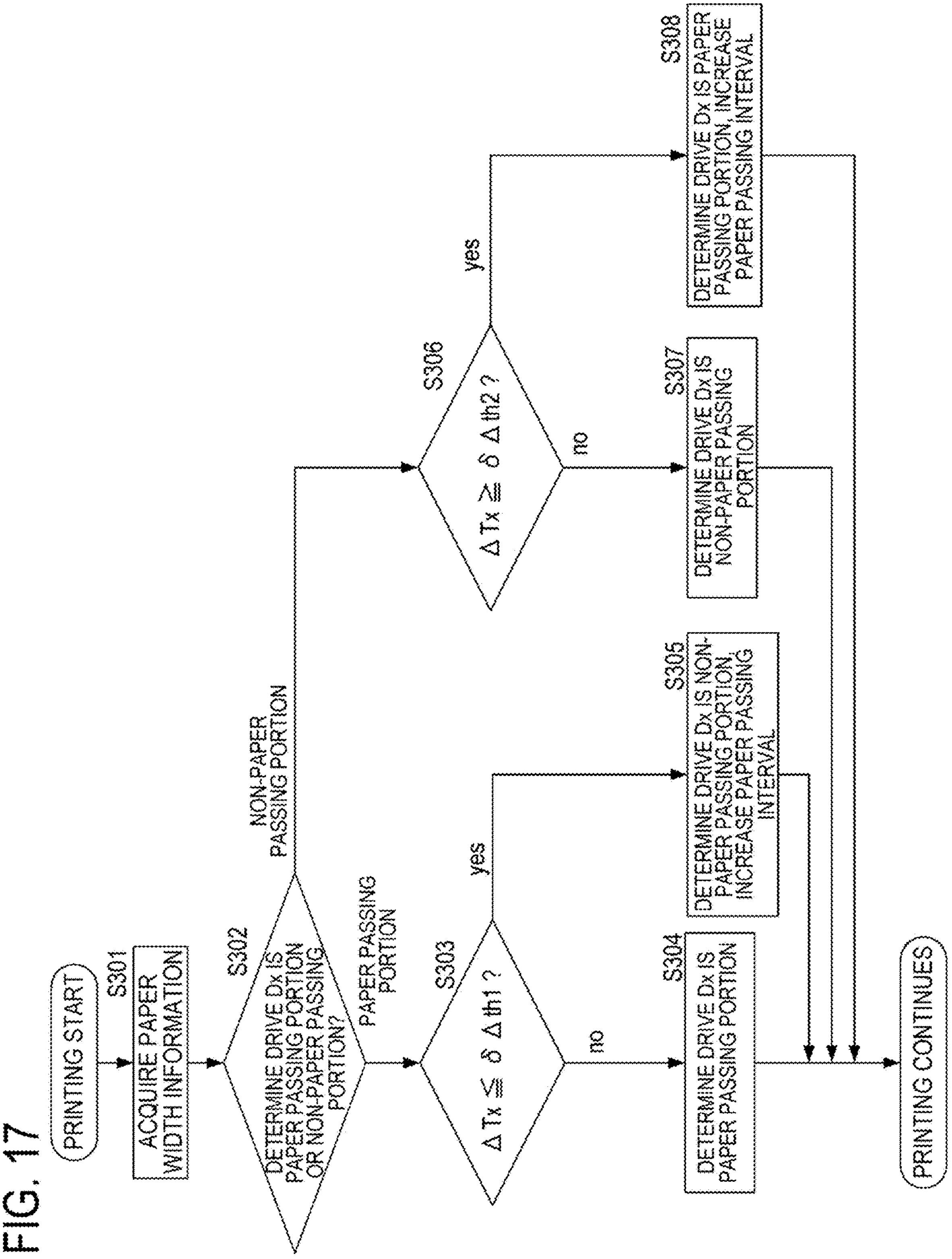
FIG. 17 is a flow chart to determine paper width according to Embodiment 3.

By applying the determination method in FIG. 17 to the cases of FIG. 7, FIG. 8 and FIG. 9, the same effect as Embodiment 1 can be implemented in Embodiment 3 as well.

3. Modification

In Embodiment 3, the deviation ΔTx between the target temperature TGTx and the temperature of the main thermistor TMx of the drive Dx is used to determine whether the drive Dx is the paper passing zone or the non-paper passing zone. In this case, however, the maximum power that can be supplied may be changed, by fluctuation of the power supply voltage of the commercial AC power supply 401 connected to the image forming apparatus. By this change, the relationship between the control duty DTx and the actual power supplied to the drive Dx may change. In this case, the supply power may deviate from the power that should be supplied, and in some cases the temperature of the main thermistor TMx may not follow the target temperature TGTx, and may overshoot or undershoot the target temperature. In such a case, it may be difficult to determine whether the drive Dx is the paper passing zone or the non-paper passing zone using the deviation ΔTx of the drive Dx alone.

Therefore, instead of the deviation ΔTx, the difference between the deviation ΔT4 of the target temperature TGT4 in the drive D4 where the conveyance reference position passes through and the temperature of the main thermistor TM4 (first difference), and the deviation ΔTx in the drive Dx (second difference), that is, ΔT4*x* (=ΔT4−ΔTx) may be used. In this case, in S303 in FIG. 17, it is determined whether a difference ΔT4*x* (third difference) is equal to or more than a predetermined threshold Δth1, and in S306, it is determined whether the difference ΔT4*x* is not more than a predetermined threshold Δth2. Thereby the paper size mismatch can be determined in a state where deviation caused by the fluctuation of the power supply voltage is cancelled.

Embodiment 4

In Embodiment 4, the paper size mismatch is determined using the deviation of the target temperature and the temperature of the main thermistor of a drive where the conveyance reference position X passes through, and the control conditions for the PID temperature control are changed after the paper size mismatch is determined, which are the differences from Embodiment 1. Description on the configuration the same as Embodiment 1 will be omitted. The method for calculating the supply power (control duty) when the control conditions are changed is the same as Embodiment 2.

1. Paper Size Mismatch Determination Method

The method for determining whether the paper width specified by the user is different from the actual paper width according to Embodiment 4 will be described with reference to the flow chart in FIG. 18. S401, S402, S404 and S407 are the same as S101, S102, S104 and S107 in FIG. 10, hence description thereof will be omitted.

If the determination in S402 is the paper passing portion, processing advances to S403, and the deviation of the target temperature TGTx and the temperature of the main thermistor TMx of the drive Dx, that is, ΔTx=TGTx−TMx, is calculated, and it is determined whether ΔTx is not more than a predetermined threshold Δth1. The threshold Δth1 is set to −5° C. in Embodiment 4. The deviation ΔTx that is not more than the threshold Δth1 means that the temperature of the main thermistor TMx overshoots the target temperature TGTx by at least 5° C.

If the determination in S403 is yes, processing advances to S405, and the drive Dx is determined as the non-paper passing zone, then the target temperature is changed to 200° C., which is the value for the non-paper passing zone, the parameter setting for the PID control is changed to the setting for the non-paper passing zone indicated in FIG. 5, and printing continues.

If the determination in S402 is the non-paper passing portion, processing advances to S406, and the deviation ΔTx is calculated, then it is determined whether the deviation ΔTx is equal to or more than a predetermined threshold Δth2. The threshold Δth2 is set to 5° C. in Embodiment 4. The deviation ΔTx that is equal to or more than the threshold Δth2 means that the temperature of the main thermistor TMx undershoots the target temperature TGTx by at least 5° C.

If the determination in S406 is yes, processing advances to S408, and the drive Dx is determined as the paper passing zone, then the target temperature is changed to 220° C. which is a value equivalent to Maxink 0% of the paper passing zone, the parameter setting for the PID control is changed to the setting for the paper passing zone indicated in FIG. 5, and printing continues. The determination and operation in S402 to S408 are repeated for each of the other drives Dx (x=1, 2, 3) as well.

2. Examples and Effects of Paper Size Mismatch Determination

Figure 18:
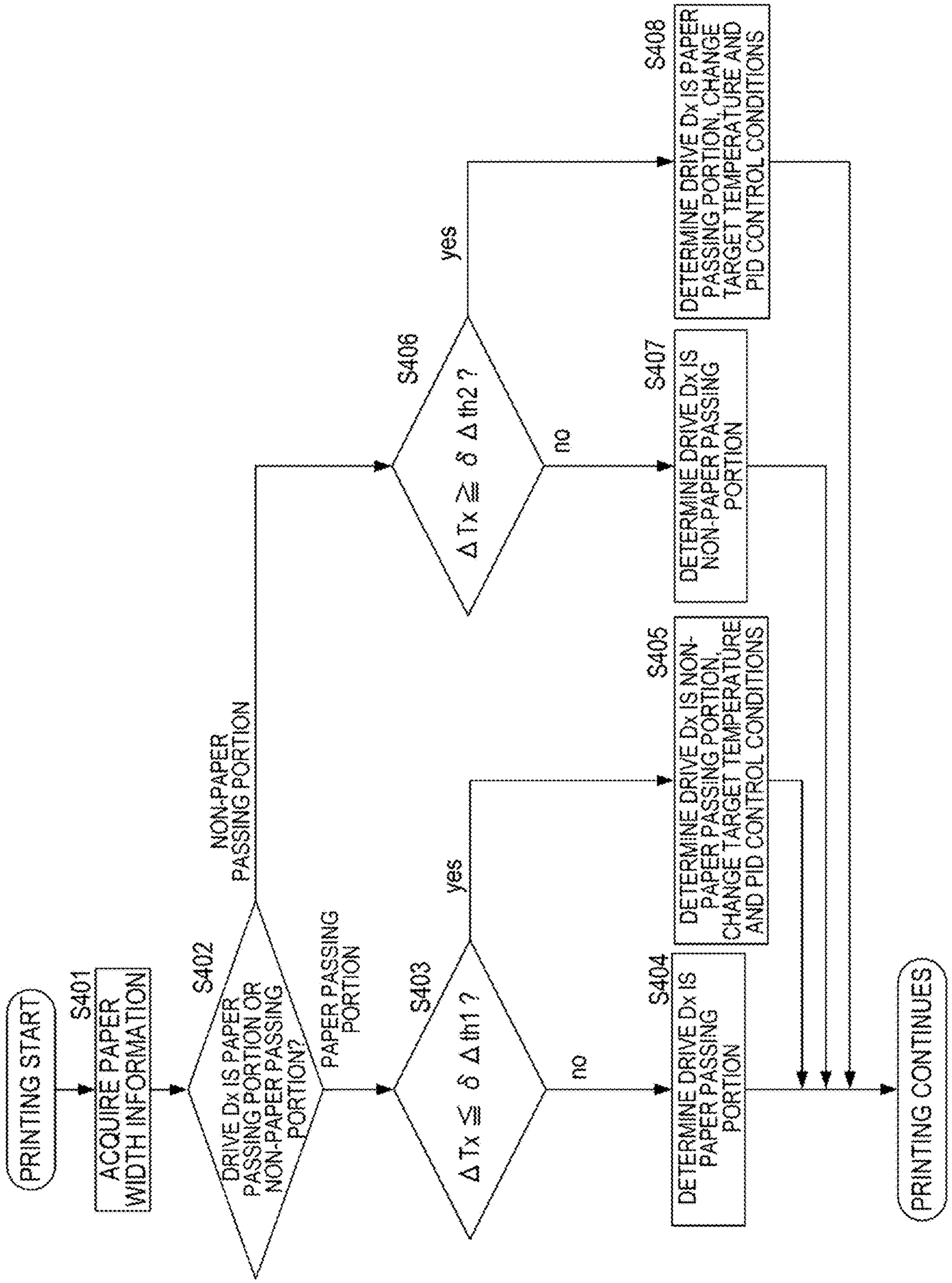
FIG. 18 is a flow chart to determine paper width according to Embodiment 4.

By applying the determination method in FIG. 18 to the cases in FIG. 7 and FIG. 8, Embodiment 4 can implement the same effect as Embodiment 2.

3. Modification

Just like Embodiment 3, instead of the deviation ΔTx, the difference between the deviation ΔT4 of the target temperature TGT4 and the temperature of the main thermistor TM4 in drive D4 (first difference), and the deviation ΔTx in the drive Dx (second difference), that is, ΔT4*x* (=ΔT4−ΔTx) may be used. In this case, in S403 in FIG. 18, it is determined whether the difference ΔT4*x* (third difference) is equal to or more than a predetermined threshold Δth1, and in S406, it is determined whether the difference ΔT4*x* is not more than the predetermined threshold Δth2. Thereby the paper size mismatch can be determined in a state where deviation caused by the fluctuation of the paper supply voltage is cancelled.

Further, just like Embodiment 2, the left and right heating blocks in a drive may be controlled independently from each other, then even if the recording material deviates as indicated in FIG. 9, the paper size mismatch determination according to Embodiment 4 can be applied.

According to each embodiment described above, it is estimated whether the recording material passes each heating region, and the control conditions of the power supplied to the heating unit and paper passing interval are changed thereby, hence the temperature distribution in a member in the longitudinal direction can be more uniform, and conveyance of the recording material is stabilized, thereby damage or the like of the fixing apparatus can be prevented.

The plurality of recording materials to be controlled in each of the above mentioned embodiments are typically a plurality of same sized recording materials which are set in a same paper feeding cassette or in a manual insertion tray, in a state where the vertical and horizontal edges are aligned, for example. The case of consecutively performing heating processing on the plurality of recording materials is not only the case of sporadically performing a plurality of printing in an individual print job, but also the case of consecutively performing thermal fixing processing when a plurality of recording materials are printed in a single print job, for example.

In the above mentioned control in each of the above embodiments, a predetermined overheat prevention control or an underheat prevention control is executed on a second or subsequent recording materials at the earliest, out of the plurality of recording materials. The prevention control is preferably at a timing immediately after the mismatch is determined, in terms of extending the life of the apparatus, but the present invention is not limited thereto. For example, in the case of widening the conveyance interval as a prevention control, the execution timing may be determined considering the balance between the print productivity and the probability of an apparatus problem generation. For example, the heat accumulation amount may be counted, so that the prevention control is started triggered by the heat accumulation count exceeding a predetermined threshold. Further, the execution of the prevention control may be only for a predetermined number of recording materials, instead of the recording materials subject to the fixing processing after the mismatch is determined. Furthermore, in the prevention control, the value of the conveyance interval, which is increased in the prevention control, may be changed. In other words, the conveyance interval may be controlled such that the influence of the temperature difference can be minimized, within a range where the apparatus problem is not generated. Thereby the generation of the apparatus problem can be suppressed while maintaining the productivity of consecutive printing.

An example of mismatch of the size of the recording material, besides the typical cases indicated in FIG. 7 and FIG. 8, is that the paper width specified by the user and the actual paper width are different, and the passing position of the recording material also deviates from the normal position. In this case as well, local overheating or underheating can be suppressed or prevented by the mismatch determination and the prevention control according to the present embodiments.

In each of the above embodiments, the heating region where the conveyance reference position X passes through is used as the reference heating region used for the mismatch determination, but the present invention is not limited thereto. For example, if there is a heating region which is known in advance to be the passing heating region, then this heating region may be used as the reference heating region to perform the mismatch determination.

Moreover, in Embodiments 2 and 4, the prevention control is performed such that the control target temperature of a heating region for which the mismatch was determined is changed from the first control target temperature for the passing heating region to the second control target temperature for the non-passing heating region, or vice versa, but the present invention is not limited thereto. For example, when the control target temperature is changed in the case where it is determined that the first heating region specified as the passing heating region is actually the non-passing heating region, a certain effect can still be expected only if the control target temperature is lower than the first control target temperature, hence the control target temperature may be decreased to a control target temperature that is different from the second control target temperature. In the same manner, when the control target temperature is changed in the case where it is determined that the second heating region specified as the non-passing heating region is actually the passing heating region, a certain effect can still be expected only if the control target temperature is higher than the second control target temperature, hence the control target temperature may be increased to a control target temperature that is different from the first control target temperature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091796, filed on Jun. 6, 2022, which is hereby incorporated by reference herein in its entirety.

What is claimed is:

1. An image heating apparatus comprising:

a tubular film;

a heater that is disposed in an inner space of the film and includes a plurality of heating blocks arranged in a longitudinal direction of the heater, which is a direction perpendicular to a conveyance direction of a recording material;

a roller that is in contact with an outer peripheral surface of the film, and sandwiches the film with the heater, and forms a nip portion with the film, where a recording material on which a toner image is formed is sandwiched and conveyed;

a plurality of temperature detecting portions configured to detect respective temperatures of a plurality of heating regions which are heated by the plurality of heating blocks respectively;

an acquiring portion configured to acquire recording material information including a size of the recording material; and a control portion, wherein in the image heating apparatus, the control portion individually controls the plurality of heating blocks based on the recording material information, and the toner image is heated in the nip portion, wherein the plurality of heating regions include a reference heating region that is specified as a heating region, which includes a conveyance reference position of the recording material, and an another heating region, which does not include the conveyance reference position, wherein in a case of performing heating processing consecutively on a plurality of recording materials, the control portion acquires a deviation of a difference between a control target temperature of the another heating region and a detected temperature by a temperature detecting portion in the another heating region, with respect to a difference between a control target temperature of the reference heating region and a detected temperature by a temperature detecting portion in the reference heating region; and determines whether the another heating region is actually the passing heating region or a non-passing heating region which a recording material does not pass through, based on whether the deviation is within a predetermined range or not.

2. The image heating apparatus according to claim 1, wherein when a determination result of the control portion does not match an acquisition result of the acquiring portion, the control portion performs control to extend a conveyance interval of the plurality of recording materials.

3. The image heating apparatus according to claim 1, wherein when a determination result of the control portion does not match an acquisition result of the acquiring portion, the control portion changes a control target temperature of the another heating block.

4. An image forming apparatus comprising:

an image forming portion configured to form a toner image on a recording material; and a fixing portion configured to fix the toner image formed on the recording material to the recording material, wherein the fixing portion is the image heating apparatus according to claim 1.

5. An image forming apparatus for forming a toner image on a recording material, comprising:

an image forming portion configured to form the toner image on the recording material;

a fixing portion configured to fix the toner image formed on the recording material to the recording material, the fixing portion includes a tubular film, a heater disposed in an inner space of the film and includes a plurality of heating blocks arranged on a substrate in a longitudinal direction of the heater, which is a direction perpendicular to a conveyance direction of a recording material, wherein the plurality of heating blocks includes a first heating block provided at a conveyance reference position of the recording material with respect to the longitudinal direction and a second heating block provided at a position different from the first heating block with respect to the longitudinal direction, a roller configured to contact with an outer peripheral surface of the film to form a nip portion, where the recording material on which the toner image is formed is sandwiched and conveyed, in cooperation with the heater through the film, a first temperature detecting element configured to detect a temperature of the first heating block, and a second temperature detecting element configured to detect a temperature of the second heating block, a first TRIAC configured to switch between a power supply state and a power supply cutoff state to the first heating block;

a second TRIAC configured to switch between a power supply state and a power supply cutoff state to the second heating block; and a controller, the controller controls the first TRIAC so that the temperature detected by the first temperature detecting element is maintained at a target temperature and controls the second TRIAC so that the temperature detected by the second temperature detecting element is maintained at a target temperature, wherein in a state where the recording material is conveyed at the nip portion and a fixing process is performed, the controller determines whether or not a size of the recording material set by a user matches the size of the recording material actually conveyed at the nip portion in accordance with an information including the size of the recording material set by the user, the temperature of the first heating block detected by the first temperature detecting element, and the temperature of the second heating block detected by the second temperature detecting element.

6. The image forming apparatus according to claim 5, wherein the controller controls the plurality of the heating blocks by PID control, and wherein a parameter of the PID control for the second heating block when the second heating block is a passing zone of the recording material is different from the parameter of the PID control for the second heating block when the second heating block is a non-passing zone of the recording material.

7. The image forming apparatus according to claim 5, wherein the controller determines a region of the nip portion corresponding to the second heating block with respect to the longitudinal direction is a passing zone or a non-passing zone of the recording material in accordance with a difference between the temperature of the first heating block detected by the first temperature detecting element and the temperature of the second heating block detected by the second temperature detecting element, and wherein the controller determines whether or not the size of the recording material set by the user matches the size of the recording material actually conveyed at the nip portion in accordance with an information according to the second heating block obtained from the information including the size of the recording material set by the user and a determination of the passing zone or the non-passing zone corresponding to the second heating block.

8. The image forming apparatus according to claim 5, wherein when the size of the recording material set by the user does not match the size of the recording material actually conveyed at the nip portion, the controller performs control to extend a conveyance interval of a plurality of the recording materials.

9. The image forming apparatus according to claim 5, wherein when the size of the recording material set by the user does not match the size of the recording material actually conveyed at the nip portion, the controller changes the target temperature of the second heating block.

10. An image forming apparatus for forming a toner image on a recording material, comprising:

an image forming portion configured to form the toner image on the recording material;

a fixing portion configured to fix the toner image formed on the recording material to the recording material, the fixing portion includes a tubular film, a heater disposed in an inner space of the film and includes a plurality of heating blocks arranged on a substrate in a longitudinal direction of the heater, which is a direction perpendicular to a conveyance direction of a recording material, wherein the plurality of heating blocks includes a first heating block provided at a conveyance reference position of the recording material with respect to the longitudinal direction and a second heating block provided at a position different from the first heating block with respect to the longitudinal direction, a roller configured to contact with an outer peripheral surface of the film to form a nip portion, where the recording material on which the toner image is formed is sandwiched and conveyed, in cooperation with the heater through the film, a first temperature detecting element configured to detect a temperature of the first heating block, and a second temperature detecting element configured to detect a temperature of the second heating block, a first TRIAC configured to switch between a power supply state and a power supply cutoff state to the first heating block;

a second TRIAC configured to switch between a power supply state and a power supply cutoff state to the second heating block; and a controller, the controller controls the first TRIAC so that the temperature detected by the first temperature detecting element is maintained at a target temperature and controls the second TRIAC so that the temperature detected by the second temperature detecting element is maintained at a target temperature, wherein in a state where the recording material is conveyed at the nip portion and a fixing process is performed, the controller determines whether or not a size of the recording material set by a user matches the size of the recording material actually conveyed at the nip portion in accordance with an information including the size of the recording material set by the user, the target temperature of the second heating block, and the temperature of the second heating block detected by the second temperature detecting element.

11. The image forming apparatus according to claim 10, wherein the controller controls the plurality of the heating blocks by PID control, and wherein a parameter of the PID control for the second heating block when the second heating block is a passing zone of the recording material is different from the parameter of the PID control for the second heating block when the second heating block is a non-passing zone of the recording material.

12. The image forming apparatus according to claim 10, wherein the controller determines a region of the nip portion corresponding to the second heating block with respect to the longitudinal direction is a passing zone or a non-passing zone of the recording material in accordance with a difference between the target temperature of the second heating block and the temperature of the second heating block detected by the second temperature detecting element, and wherein the controller determines whether or not the size of the recording material set by the user matches the size of the recording material actually conveyed at the nip portion in accordance with an information according to the second heating block obtained from the information including the size of the recording material set by the user and a determination of the passing zone or the non-passing zone corresponding to the second heating block.

13. The image forming apparatus according to claim 10, wherein when the size of the recording material set by the user does not match the size of the recording material actually conveyed at the nip portion, the controller performs control to extend a conveyance interval of a plurality of the recording materials.

14. The image forming apparatus according to claim 10, wherein when the size of the recording material set by the user does not match the size of the recording material actually conveyed at the nip portion, the controller changes the target temperature of the second heating block.

* * * * *